(12) United States Patent
Masugi

(10) Patent No.: US 7,830,616 B2
(45) Date of Patent: Nov. 9, 2010

(54) ZOOM LENS, OPTICAL APPARATUS AND MANUFACTURING METHOD

(75) Inventor: Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/572,302

(22) Filed: Oct. 2, 2009

(65) Prior Publication Data

US 2010/0085648 A1 Apr. 8, 2010

(30) Foreign Application Priority Data

Oct. 2, 2008 (JP) .............................. 2008-256939

(51) Int. Cl.
*G02B 15/14* (2006.01)
(52) U.S. Cl. ...................... 359/689; 359/682
(58) Field of Classification Search ................. 359/689, 359/680–682

See application file for complete search history.

(56) References Cited

U.S. PATENT DOCUMENTS

| | | | |
|---|---|---|---|
| 4,999,007 A | 3/1991 | Aoki et al. | |
| 6,124,984 A | 9/2000 | Shibayama et al. | |
| 6,972,908 B2 | 12/2005 | Noda | |
| 7,006,300 B2 | 2/2006 | Shinohara | |
| 7,177,091 B2 | 2/2007 | Iwasawa et al. | |
| 7,209,298 B2 | 4/2007 | Iwasawa et al. | |
| 7,277,233 B2 | 10/2007 | Satori | |
| 7,292,380 B2 * | 11/2007 | Kim | ............................... 359/2 |
| 7,599,126 B2 * | 10/2009 | Kurioka | ...................... 359/689 |
| 2009/0268308 A1 | 10/2009 | Masugi | |

FOREIGN PATENT DOCUMENTS

| | | |
|---|---|---|
| JP | 01-191820 A | 8/1989 |
| JP | 10-170826 A | 6/1998 |
| JP | 2005-181774 A | 7/2005 |
| JP | 2005-274662 A | 10/2005 |
| JP | 2006-18199 A | 1/2006 |
| JP | 2006-78581 A | 3/2006 |
| JP | 2006-154172 A | 6/2006 |
| JP | 2006-194975 A | 7/2006 |
| JP | 2009-265171 A | 2/2009 |

* cited by examiner

*Primary Examiner*—Scott J Sugarman
(74) *Attorney, Agent, or Firm*—Miles & Stockbridge P.C.

(57) ABSTRACT

A zoom lens comprises, in order from an object, a first lens group G1 having negative refractive power, a second lens group G2 having positive refractive power, and a third lens group G3 having positive refractive power. The first lens group G1 consists of one spherical negative lens and one spherical positive lens with an air space therebetween, and the conditional expression $0.50<(DG1+DG2+DG3)/fw<1.75$ is satisfied, where DG1 to DG3 denote the thickness of the first lens group G1 to third lens group G3 respectively on the optical axis, and fw denotes the focal length of the zoom lens in the wide-angle end state.

22 Claims, 32 Drawing Sheets

Example 1

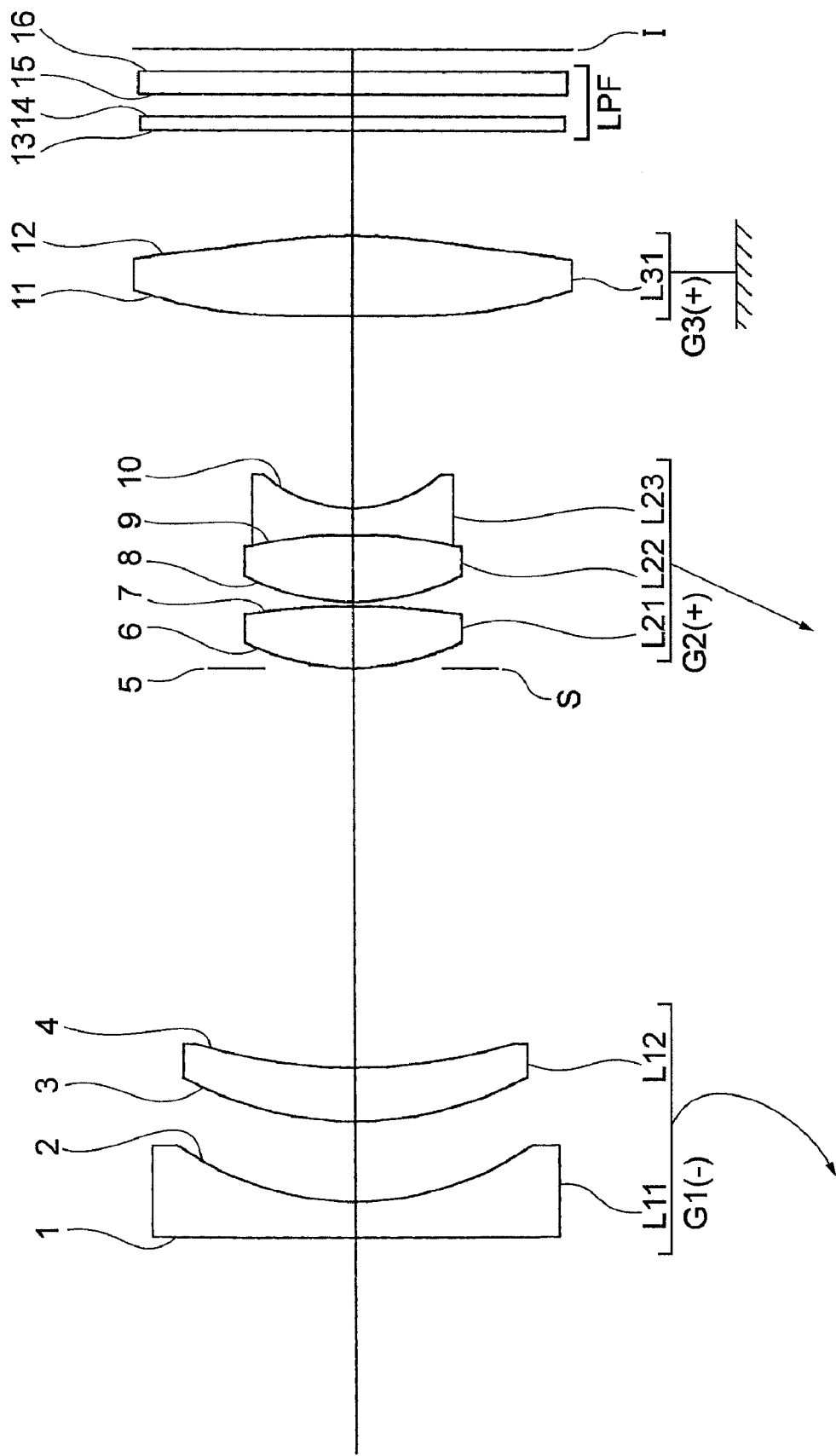

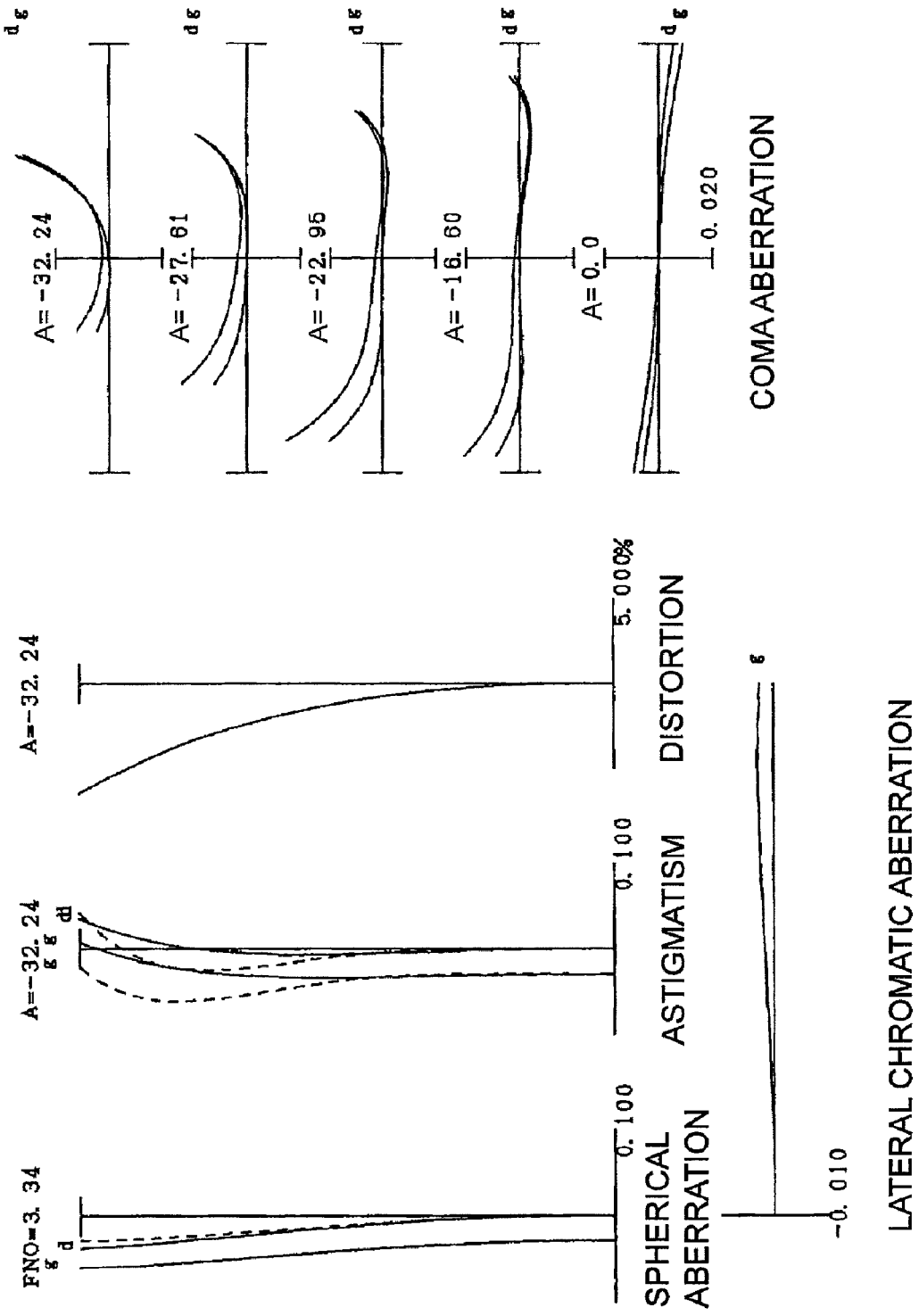

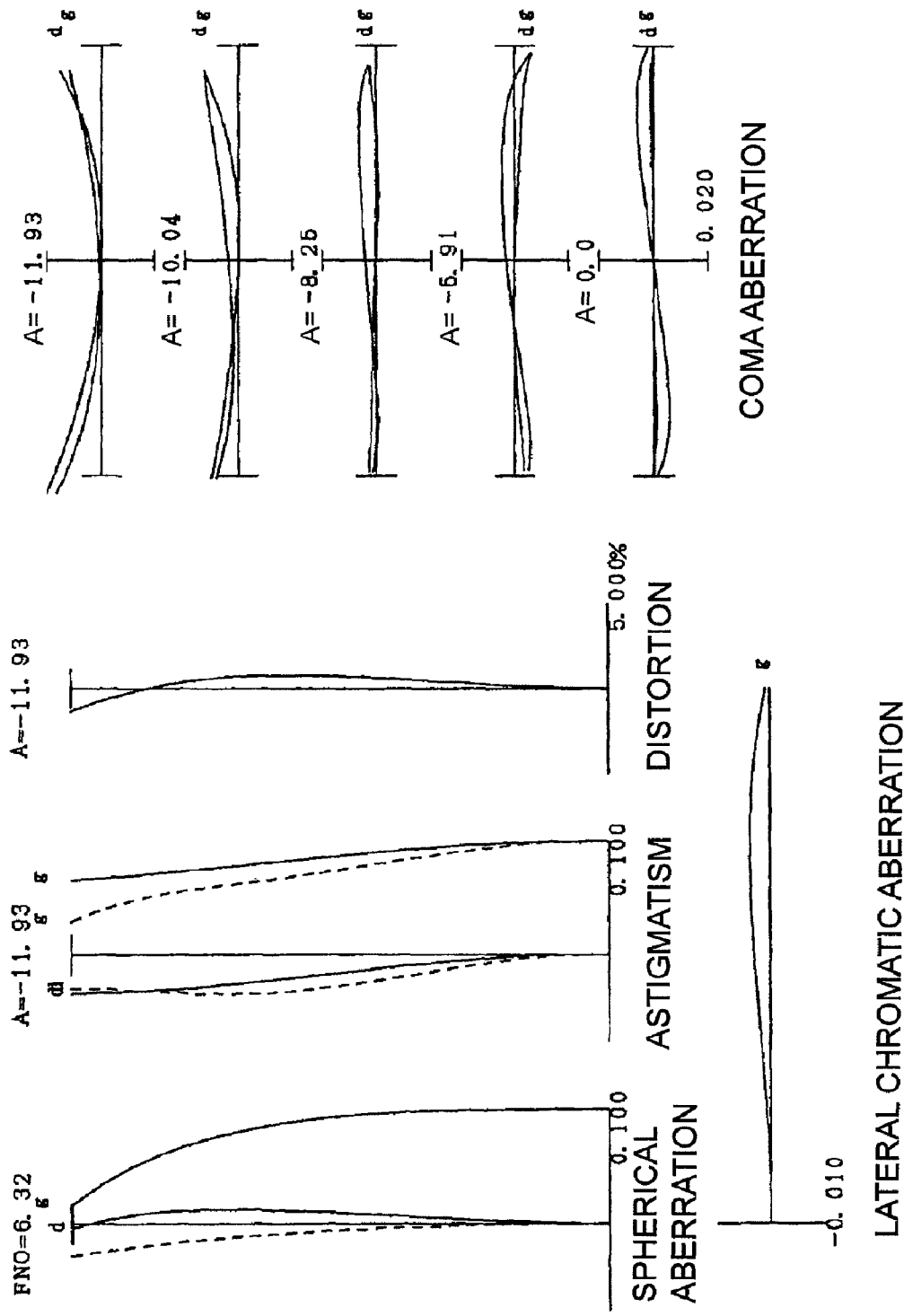

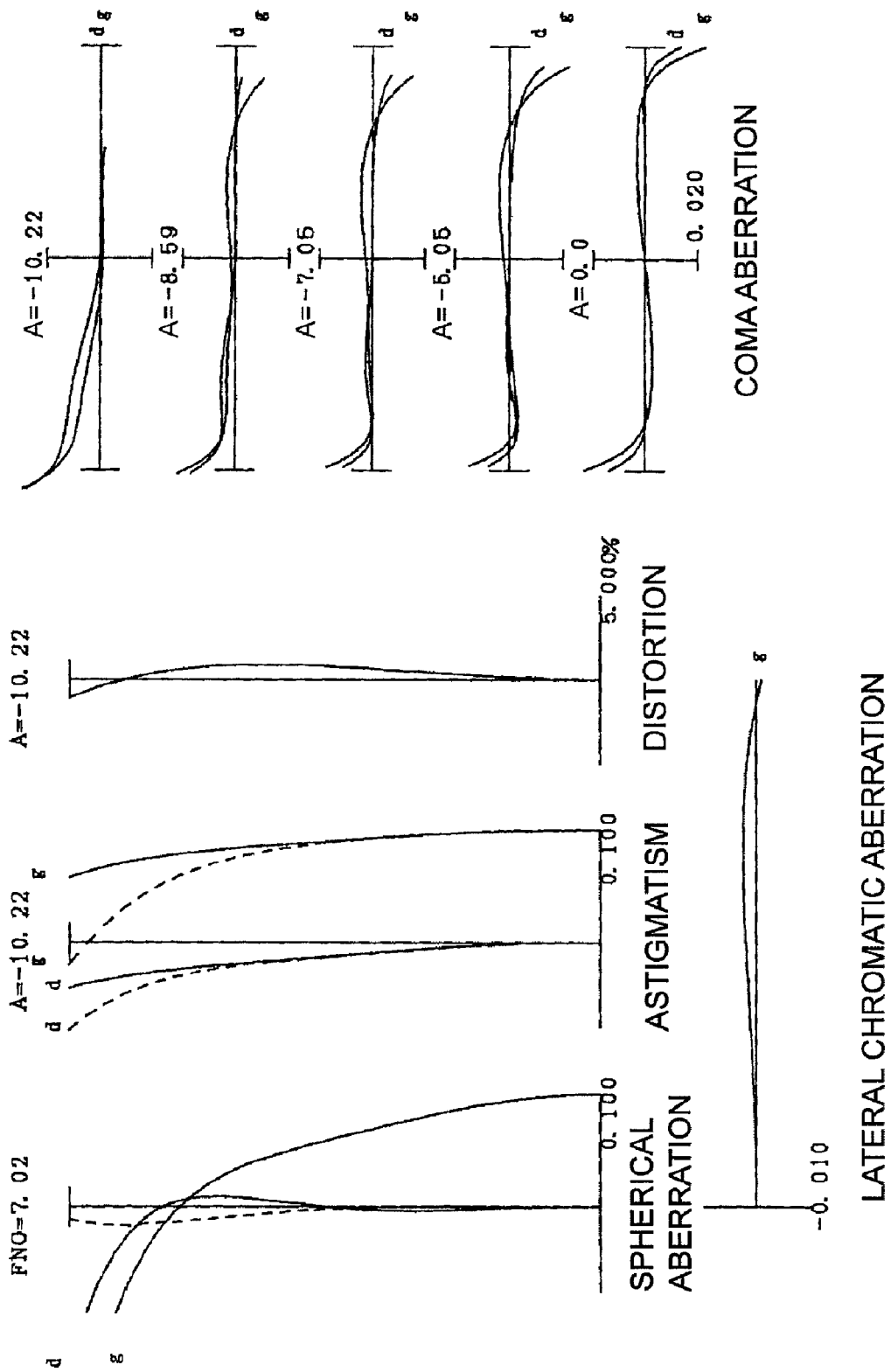

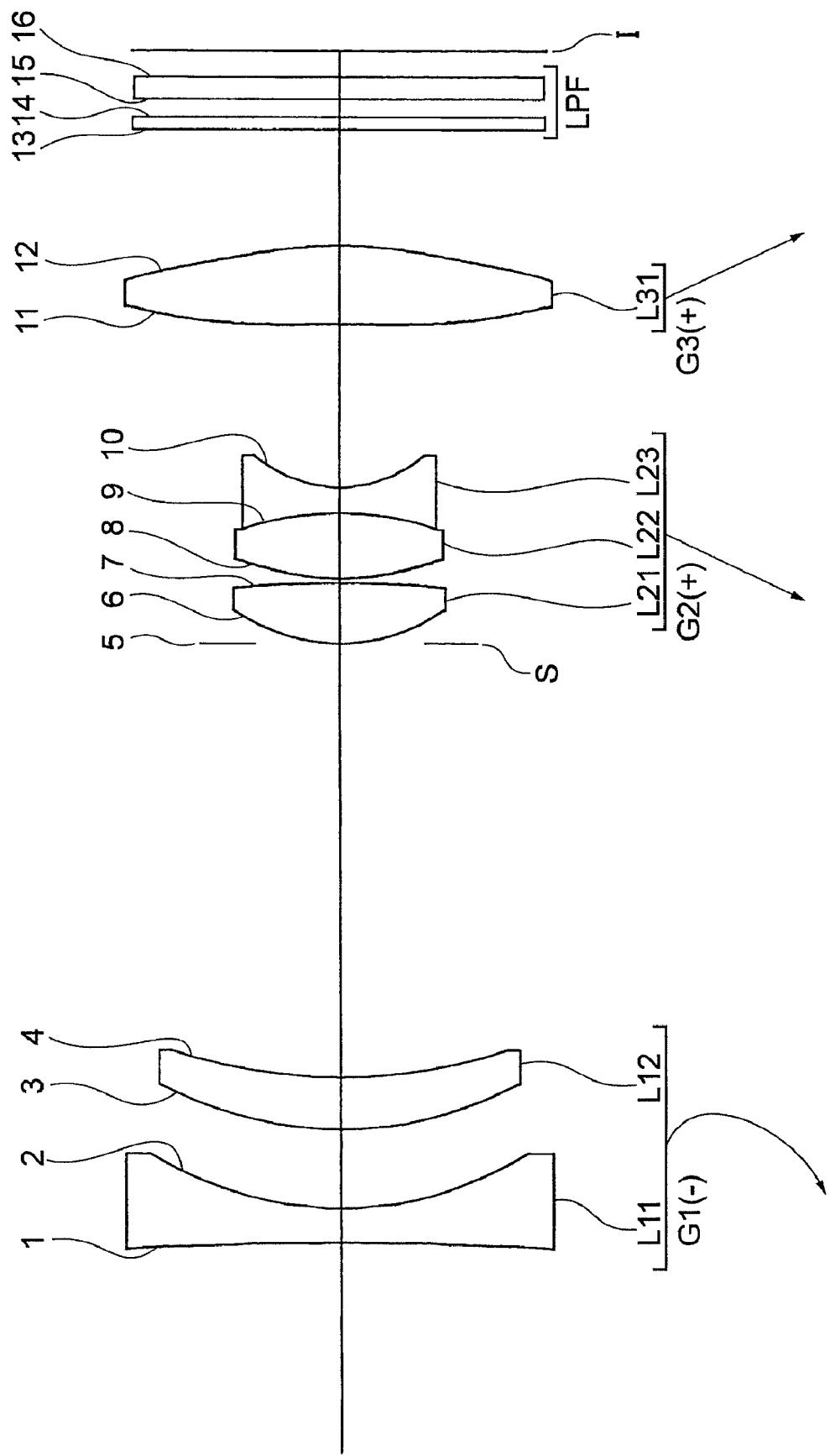

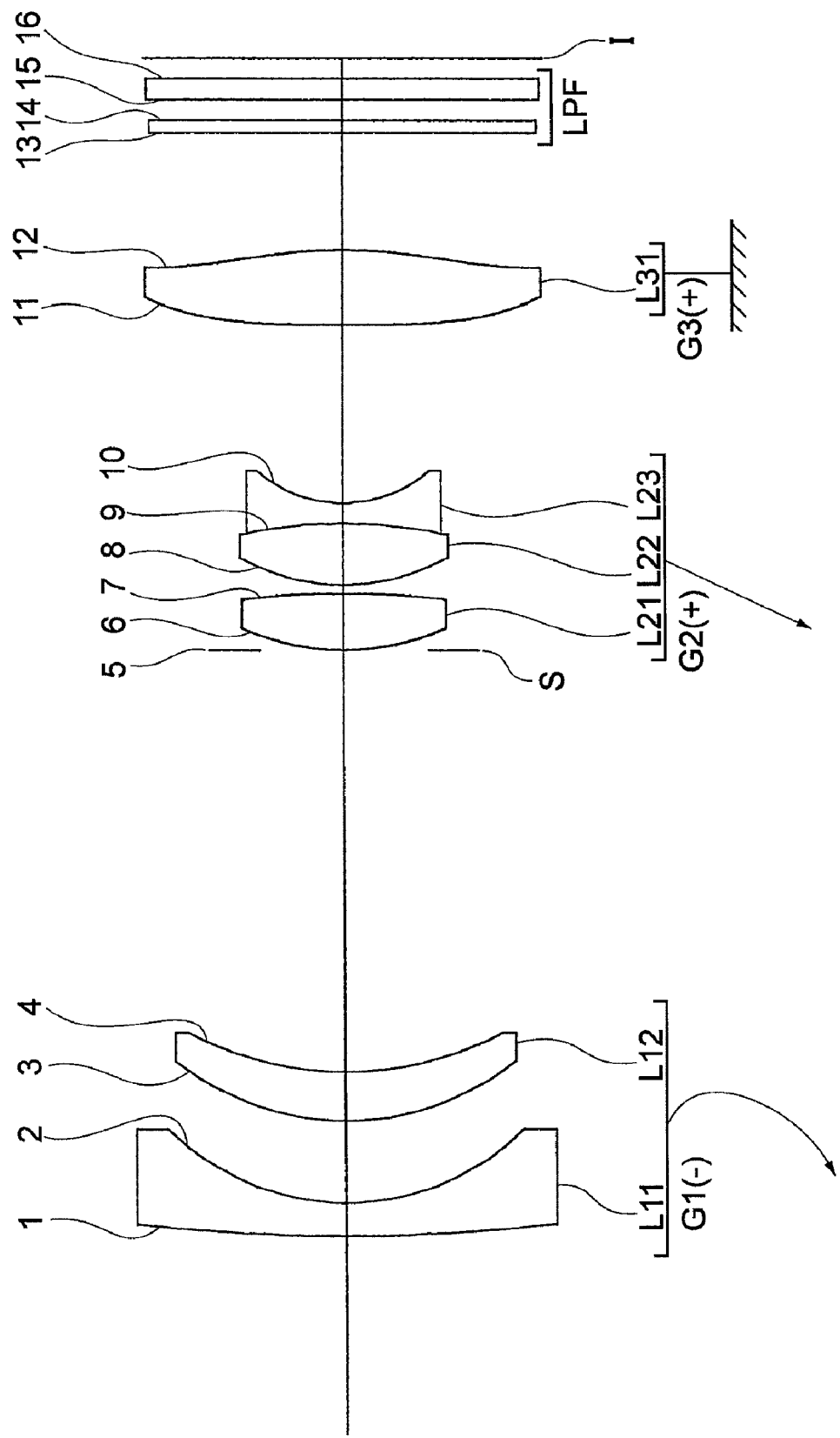

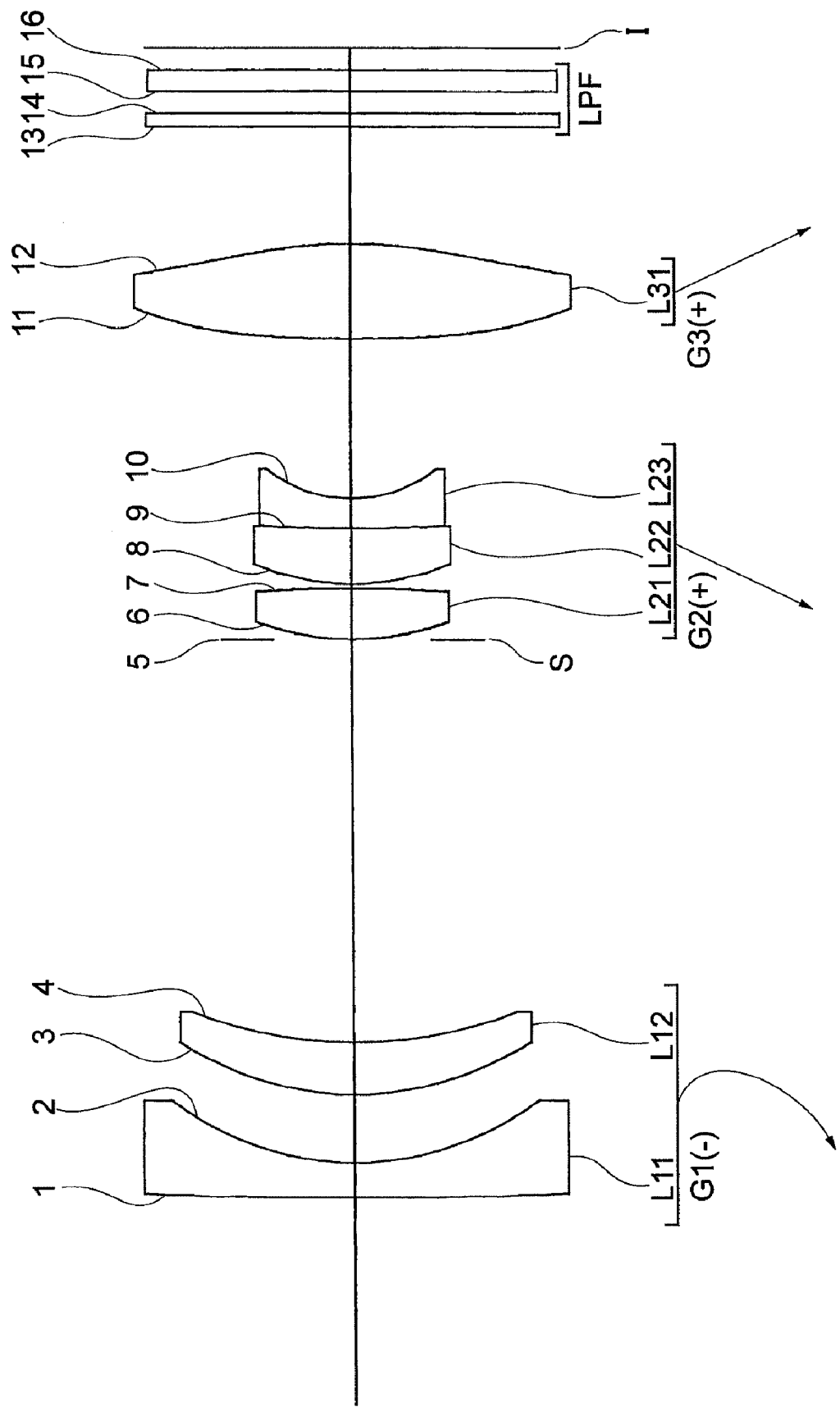

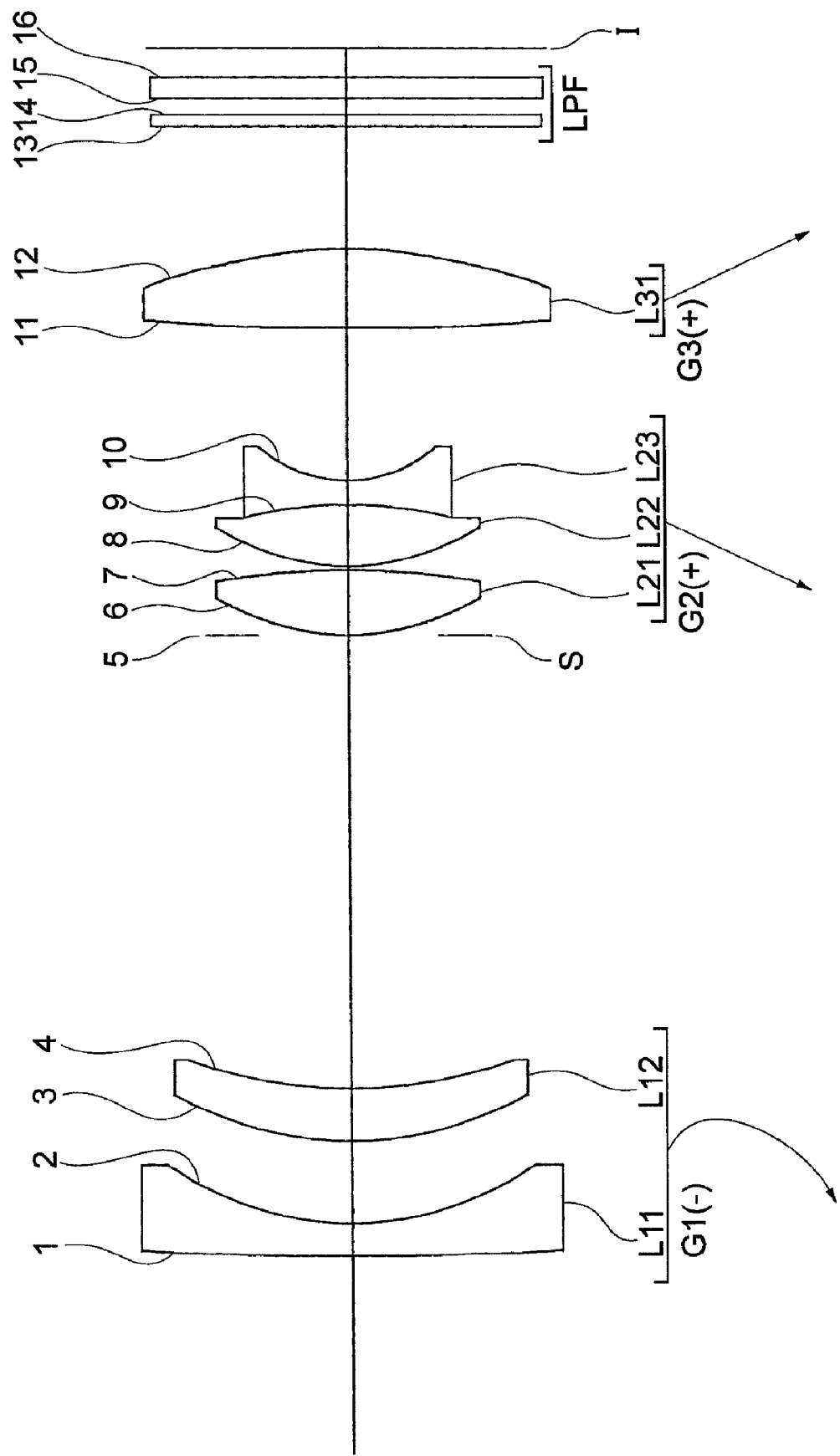

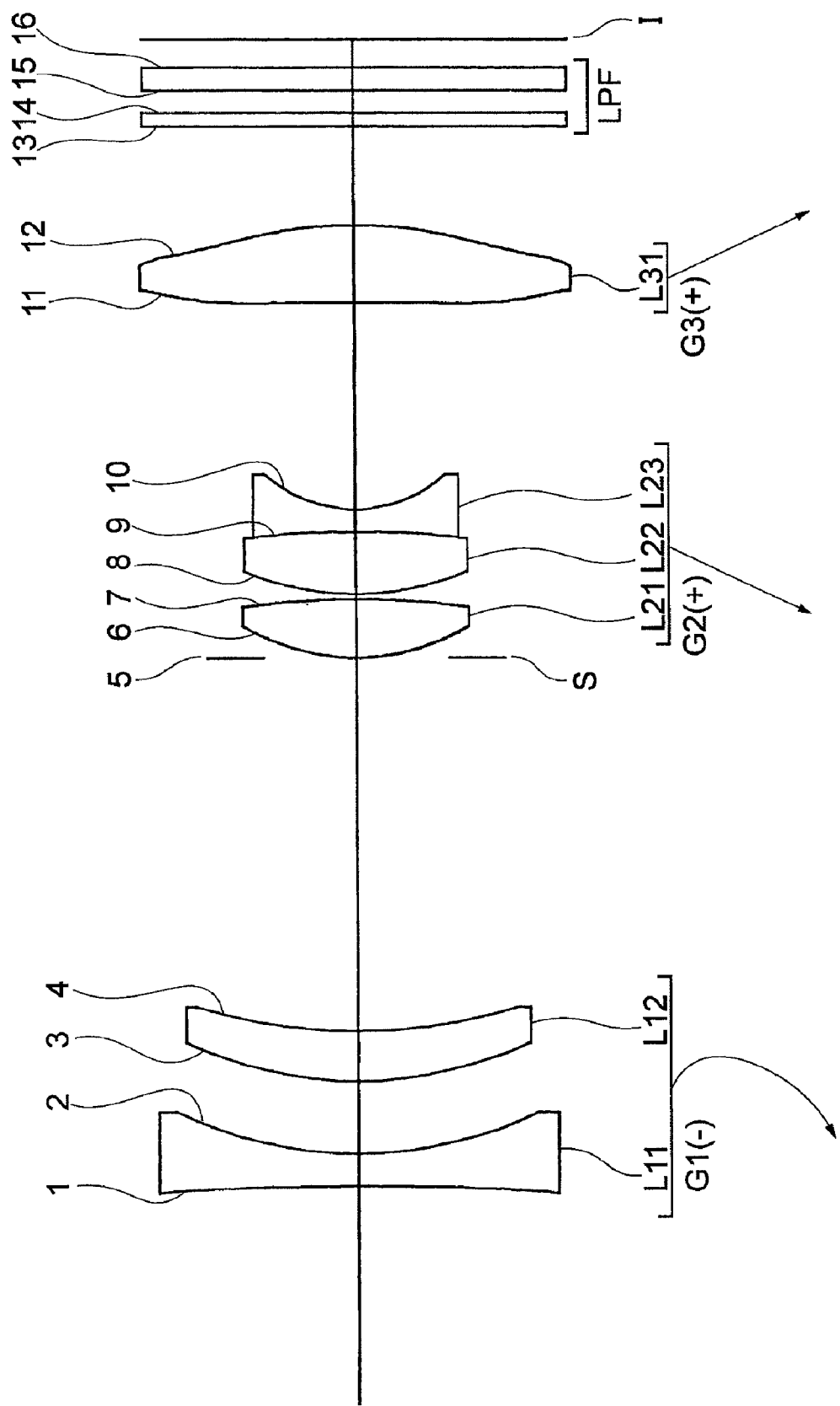

ZOOM LENS, OPTICAL APPARATUS AND MANUFACTURING METHOD

INCORPORATION BY REFERENCE

This invention claims the benefit of Japanese Patent Application No. 2008-256939 which is hereby incorporated by reference.

FIELD OF THE INVENTION

The present invention relates to a zoom lens, optical apparatus and manufacturing method.

BACKGROUND OF THE INVENTION

Recently importance is placed on the portability of a digital camera, and in order to decrease size, thickness and weight of a main body of a camera, a decrease in the size and weight of a lens system to be equipped in the camera is being attempted. For example, a zoom lens comprising, in order from an object, a first lens group having negative refractive power, a second lens group having positive refractive power and a third lens group having positive refractive power, wherein the first lens group consists of only two lenses: a negative lens and a positive lens, by effectively disposing an aspherical lens in the first lens group, has been disclosed (e.g. see Japanese Patent Application Laid-Open No. 2006-154172).

SUMMARY OF THE INVENTION

Problems to be Solved by the Invention

If an aspherical lens is used for the first lens group like this prior art, however, the required lens surface accuracy is very exacting, and deterioration of optical performance due to an error in processing and assembly adjustment is major. The manufacturing cost also increases considerably.

With the foregoing in view, it is an object of the present invention to provide a zoom lens and optical apparatus that are compact, and generate high image quality, yet can be manufactured at low cost, and a manufacturing method thereof.

Means to Solve the Problems

In order to achieve this object, a zoom lens of the present invention comprises, in order from an object: a first lens group having negative refractive power; a second lens group having positive refractive power; and a third lens group having positive refractive power, the first lens group consisting of a spherical negative lens and a spherical positive lens with an air space therebetween, and the following conditional expression being satisfied:

$$0.50 < (DG1+DG2+DG3)/fw < 1.75,$$

where DG1 denotes a thickness of the first lens group on the optical axis, DG2 denotes a thickness of the second lens group on the optical axis, DG3 denotes a thickness of the third lens group on the optical axis, and fw denotes a focal length of the zoom lens in the wide-angle end state.

It is preferable that the above mentioned first lens group satisfies the following conditional expression: $-0.125 < (R2-R3)/(R2+R3) < 0.125$, where R2 denotes a radius of curvature on the image side of the lens disposed to the object side, and R3 denotes a radius of curvature of the object side of the lens disposed to the image side.

In the zoom lens, it is preferable that the following conditional expression is satisfied: $0.55 < (-f1)/ft < 0.85$, where f1 denotes a focal length of the first lens group and ft denotes a focal length of the zoom lens in the telephoto end state.

In the zoom lens, it is preferable that the following conditional expression is satisfied: $0.20 < f2/ft < 0.52$, where f2 denotes a focal length of the second lens group and ft denotes a focal length of the zoom lens in the telephoto end state.

In the zoom lens, it is preferable that the following conditional expression is satisfied: $2.05 < f3/fw < 3.50$, where f3 denotes a focal length of the third lens group and fw denotes a focal length of the zoom lens in the wide-angle end state.

In the zoom lens, it is preferable that the following conditional expression is satisfied: $0.08 < d2/(-f1) < 0.16$, where f1 denotes a focal length of the first lens group, and d2 denotes the air space between the spherical negative lens and the spherical positive lens constituting the first lens group.

In the zoom lens, it is preferable that the following conditional expression is satisfied: $3.5 < S < 12.0$, where S denotes a shape factor of the positive lens constituting the first lens group (shape factors are defined as $S=(r2+r1)/(r2-r1)$, where r1 denotes a radius of curvature of the lens surface to the object side of the positive lens on the optical axis, and r2 denotes the radius of curvature of the lens surface to the image side of the positive lens on the optical axis).

In the zoom lens, it is preferable that the lens constituting the third lens group is an aspherical lens.

In the zoom lens, it is preferable that the lens constituting the third lens group is a plastic lens.

In the zoom lens, it is preferable that the lens constituting the third lens group comprises a single lens component.

In the zoom lens, it is preferable that the lens constituting the third lens group comprises a single lens element.

In the zoom lens, it is preferable that an aperture stop is disposed between the first lens group and the second lens group.

In the zoom lens, it is preferable that the aperture stop moves together with the second lens group upon zooming from the wide-angle end state to the telephoto end state.

In the zoom lens, it is preferable that the second lens group comprises, in order from an object, a positive lens, and a cemented lens of a positive lens and a negative lens.

In the zoom lens, it is preferable that the second lens group consists of, in order from an object, a positive lens, and a cemented lens of a positive lens and a negative lens.

In the zoom lens, it is preferable that the distance between the first lens group and the second lens group, and the distance between the second lens group and the third lens group change respectively, upon zooming from the wide-angle end state to the telephoto end state.

In the zoom space, it is preferable that the third lens group is fixed in the optical axis direction, upon zooming from the wide-angle end state to the telephoto end state.

An optical apparatus of the present invention equips the zoom lens having the above mentioned configuration.

A manufacturing method for a zoom lens of the present invention is a manufacturing method for a zoom lens having, in order from an object, a first lens group, a second lens group, and a third lens group, the method comprising the steps of: disposing only one spherical negative lens and one spherical positive lens with an air space therebetween, as the first lens group; and disposing each lens so that the first lens group has negative refractive power, the second lens group has positive refractive power, and the third lens group has positive refractive power, while satisfying the following conditional expression:

$$0.50<(DG1+DG2+DG3)/fw<1.75,$$

where DG1 denotes a thickness of the first lens group on the optical axis, DG2 denotes a thickness of the second lens group on the optical axis, and DG3 denotes a thickness of the third lens group on the optical axis, and fw denotes a focal length of the zoom lens in the wide-angle end state.

In the manufacturing method for the zoom lens, it is preferable that the first lens group satisfies the following conditional expression:

$$-0.125<(R2-R3)/(R2+R3)<0.125,$$

where R2 denotes a radius of curvature on the image side of the lens disposed to the object side, and R3 denotes a radius of curvature on the object side of the lens disposed to the image side.

In the manufacturing method for the zoom lens, it is preferable that the following conditional expression is satisfied:

$$0.55<(-f1)/ft<0.85$$

where f1 denotes a focal length of the first lens group and ft denotes a focal length of the zoom lens in the telephoto end state.

In the following method for the zoom lens, it is preferable that the following conditional expression is satisfied:

$$0.20<f2/ft<0.52$$

where f2 denotes a focal length of the second lens group and ft denotes a focal length of the zoom lens in the telephoto end state.

ADVANTAGEOUS EFFECTS OF THE INVENTION

According to the present invention, a zoom lens and optical apparatus that are compact, generate high image quality yet can be manufactured at low cost, and a manufacturing method thereof, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram depicting a configuration and zoom locus of the zoom lens according to Example 1;

FIG. 5 is a diagram depicting a configuration and zoom locus of the zoom lens according to Example 3;

FIG. 7 is a diagram depicting a configuration and zoom locus of the zoom lens according to Example 4;

FIG. 9 is a diagram depicting a configuration and zoom locus of the zoom lens according to Example 5;

FIG. 11 is a diagram depicting a configuration and zoom locus of the zoom lens according to Example 6;

FIG. 13 is a diagram depicting a configuration and zoom locus of the zoom lens according to Example 7;

FIG. 15 shows a digital still camera having the zoom lens according to the present embodiment, where

DESCRIPTION OF THE PREFERRED EMBODIMENTS

Figure 2B:
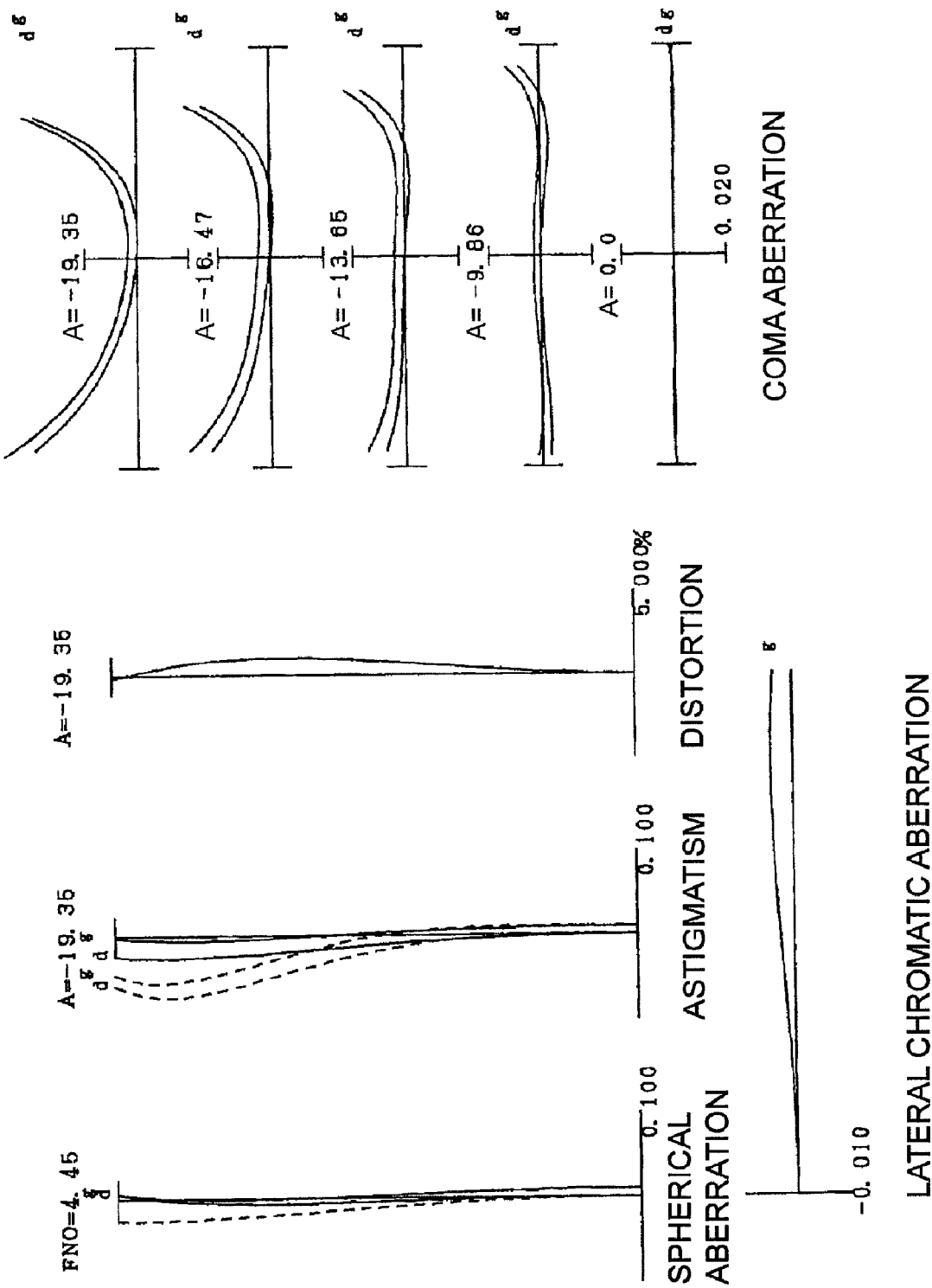
FIG. 2 are graphs showing various aberrations of the zoom lens according to Example 1, where FIG. 2A are graphs showing various aberrations upon focusing on infinity in the wide-angle end state, FIG. 2B are graphs showing various aberrations upon focusing on infinity in the intermediate focal length state, and FIG. 2C are graphs showing various aberrations upon focusing on infinity in the telephoto end state.

Preferred embodiments will now be described with reference to the drawings. As FIG. 1 shows, a zoom lens according to the present embodiment has, in order from an object, a first lens group G1 having negative refractive power, a second lens group G2 having positive refractive power and a third lens group G3 having positive refractive power, and the first lens group G1 consists of one spherical negative lens and one spherical positive lens with an air space there between (lens L11 and L12 in FIG. 1). Since the first lens group G1 consists of only two lenses, a spherical negative lens and a spherical positive lens, a drop in the optical performance due to a processing error can be decreased, and fluctuation of astigmatism during assembly can be minimized. Since an expensive negative meniscus aspherical lens need not be used, manufacturing cost can be decreased dramatically. The spherical lens includes a lens of which one side is a plane.

Based on this configuration, the present embodiment satisfies the following conditional expression (1):

$$0.50 < (DG1 + DG2 + DG3)/fw < 1.75 \quad (1)$$

where DG1 to DG3 denotes thickness of the first lens group G1 to third lens group G3 on the optical axis, and fw denotes a focal length of the zoom lens in the wide-angle end state.

The conditional expression (1) specifies an appropriate ratio of the sum of the thickness of each lens group DG1 to DG3 to the focal length fw of the zoom lens in the wide-angle end state. If the upper limit value of this conditional expression (1) is exceeded, the entire optical system becomes large, which does not support the objective of downsizing of the present zoom lens. Coma aberration and astigmatism also worsens, which is not preferable. If the lower limit value of the conditional expression (1) is not reached, on the other hand, correction of astigmatism becomes difficult.

To ensure the effect of the present embodiment, it is preferable to set the upper limit value of the conditional expression (1) to 1.70. Also to further ensure the effect of the present embodiment, it is preferable to set the upper limit value of the conditional expression (1) to 1.65.

To ensure the effect of the present embodiment, it is preferable to set the lower limit value of the conditional expression (1) to 0.70. And to further ensure the effect of the present embodiment, it is preferable to set the lower limit value of the conditional expression (1) to 1.00.

In the present embodiment, it is preferable that the first lens group G1 satisfies the following conditional expression (2):

$$-0.125 < (R2 - R3)/(R2 + R3) < 0.125 \quad (2)$$

where R2 denotes a radius of curvature of the image side of the lens disposed to the object side, and R3 denotes a radius of curvature of the object side of the lens disposed to the image side.

The conditional expression (2) specifies a shape factor when the air space between the spherical negative lens and the spherical positive lens of the first lens group G1 is regarded as an air lens. If the upper limit value of this conditional expression (2) is exceeded, the distortion and astigmatism worsen, which is not preferable. If the lower limit value of the conditional expression (2) is not reached, on the other hand, the distortion and astigmatism worsen, which is not preferable. To ensure the effect of the present embodiment, it is preferable to set the upper limit value of the conditional expression (2) to 0.050. Also to ensure the effect of the present embodiment, it is preferable to set the lower limit value of the conditional expression (2) to −0.100.

In the present embodiment, it is preferable to satisfy the conditional expression (3):

$$0.55 < (-f1)/ft < 0.85 \quad (3)$$

where f1 denotes a focal length of the first lens group G1, and ft denotes a focal length of the zoom lens in the telephoto end state.

The conditional expression (3) specifies an appropriate ratio of the focal length f1 of the first lens group G1 to the focal length ft of the zoom lens in the telephoto end state. If the upper limit value of the conditional expression (3) is exceeded, the distance between the first lens group G1 and the second lens group G2 decreases, which makes downsizing difficult. Astigmatism also worsens, which is not preferable. If the lower limit value of the conditional expression (3) is not reached, on the other hand, the moving amount of the second lens group G2 increases, which increases the size of the zoom lens. Astigmatism also worsens, which is not preferable. To ensure the effect of the present embodiment, it is preferable to set the upper limit value of the conditional expression (3) to 0.80. Also to ensure the effect of the present embodiment, it is preferable to set the lower limit value of the conditional expression (3) to 0.56.

In the present embodiment, it is preferable to satisfy the following conditional expression (4):

$$0.20 < f2/ft < 0.52 \quad (4)$$

where f2 is a focal length of the second lens group G2 and ft is a focal length of the zoom lens in the telephoto end state.

The conditional expression (4) specifies an appropriate ratio of the focal length f2 of the second lens group G2 to the focal length ft of the zoom lens in the telephoto end state. If the upper limit value of this conditional expression (4) is exceeded, the astigmatism dramatically worsens, and the moving amount of each lens group increases, which makes downsizing, that is the object of the present zoom lens, difficult, which is therefore not preferable. If the lower limit value of the conditional expression (4) is not reached as well, astigmatism dramatically worsens, and the moving amount of each lens group increases, which makes downsizing, that is the object of the present zoom lens, difficult, and which is therefore not preferable. To ensure the effect of the present embodiment, it is preferable to set the upper limit value of the conditional expression (4) to 0.50. Also to ensure the effect of the present embodiment, it is preferable to set the lower limit value of the conditional expression (4) to 0.30.

By satisfying the conditional expression (3) and the conditional expression (4), the zoom ratio can be increased triple or more, while preventing an increase in the size of the zoom lens according to the present embodiment.

In the present embodiment, it is preferable to satisfy the following conditional expression (5):

$$2.05 < f3/fw < 3.50 \quad (5)$$

where f3 denotes a focal length of the third lens group G3 and fw denotes a focal length of the zoom lens in the wide-angle end state.

The conditional expression (5) specifies an appropriate ratio of the focal length f3 of the third lens group G3 to the focal length fw of the zoom lens in the wide-angle end state. If the upper limit value of this conditional expression (5) is exceeded or if the lower limit value thereof is not reached, curvature of field and astigmatism worsen, which is not preferable. To ensure the effect of the present embodiment, it is preferable to set the upper limit value of the conditional expression (5) to 3.00. Also to ensure the effect of the present embodiment, it is preferable to set the lower limit value of the conditional expression (5) to 2.15.

In the present embodiment, it is preferable to satisfy the following conditional expression (6):

$$0.08 < d2/(-f1) < 0.16 \qquad (6)$$

where d2 denotes an air space between the negative lens and the positive lens constituting the first lens group G1 and f1 denotes a focal length of the first lens group G1.

The conditional expression (6) specifies an appropriate ratio of the air space d2 between the spherical negative lens and the spherical positive lens of the first lens group G1 to the focal length f1 of the first lens group G1. If the upper limit value of this conditional expression (6) is exceeded, the zoom lens size increases, which is not preferable. The coma aberration and astigmatism also worsen. If the lower limit value of the conditional expression (6) is not reached, on the other hand, lateral chromatic Aberration and distortion dramatically worsen, which is not preferable. To ensure the effect of the present embodiment, it is preferable to set the upper limit value of the conditional expression (6) to 0.15. Also to ensure the effect of the present embodiment, it is preferable to set the lower limit value of the conditional expression (6) to 0.10.

In the present embodiment, it is preferable to satisfy the following expression (7):

$$3.5 < S < 12.0 \qquad (7)$$

where S denotes a shape factor of the positive lens constituting the first lens group G1 (the shape factor S is defined as $S=(r2+r1)/(r2-r1)$, where r1 denotes a radius of curvature of the lens surface to the object side of the positive lens on the optical axis, and r2 denotes a radius of curvature of the lens surface to the image side of the positive lens on the optical axis).

The conditional expression (7) specifies a shape factor of the spherical positive lens of the first lens group G1. If the upper limit value of this conditional expression (7) is exceeded, the astigmatism worsens, which is not preferable. If the lower limit value of the conditional expression (7) is not reached, on the other hand, the distortion worsens, which is not preferable. To ensure the effect of the present embodiment, it is preferable to set the upper limit value of the conditional expression (7) to 10.0. Also to ensure the effect of the present embodiment, it is preferable to set the lower limit value of the conditional expression (7) to 4.5.

In the present embodiment, it is preferable that a lens constituting the third lens group G3 is an aspherical lens. By this configuration, astigmatism and distortion, which can be corrected by the first lens group G1, can be appropriately corrected.

It is also preferable that a lens constituting the third lens group G3 is a plastic lens. A problem of a plastic lens is fluctuation of the refractive index due to temperature change, but in the zoom lens according to the present embodiment, the plastic lens is used for a third lens group G3 which is close to the image plane I. So a performance change caused by temperature change can substantially be ignored. Therefore, in terms of manufacturing cost, it is preferable to use a plastic lens for the third lens group G3.

It is also preferable that an aperture stop S is disposed between the first lens group G1 and the second lens group G2. By this configuration, coma aberration can be appropriately corrected.

It is preferable that the aperture stop S moves together with the second lens group G2 upon zooming from the wide-angle end state to the telephoto end state. By this configuration, coma aberration can be appropriately corrected.

It is preferable that the second lens group G2 comprises, in order from an object, a positive lens and a cemented lens of a positive lens and negative lens. By this configuration, the spherical aberration and coma aberration can be appropriately correctly.

It is preferable that the distance between the first lens group G1 and the second lens group G2, and the distance between the second lens group G2 and the third lens group G3 change upon zooming from the wide-angle end state to the telephoto end state. By this configuration, astigmatism fluctuation upon zooming can be decreased.

Figure 15A:
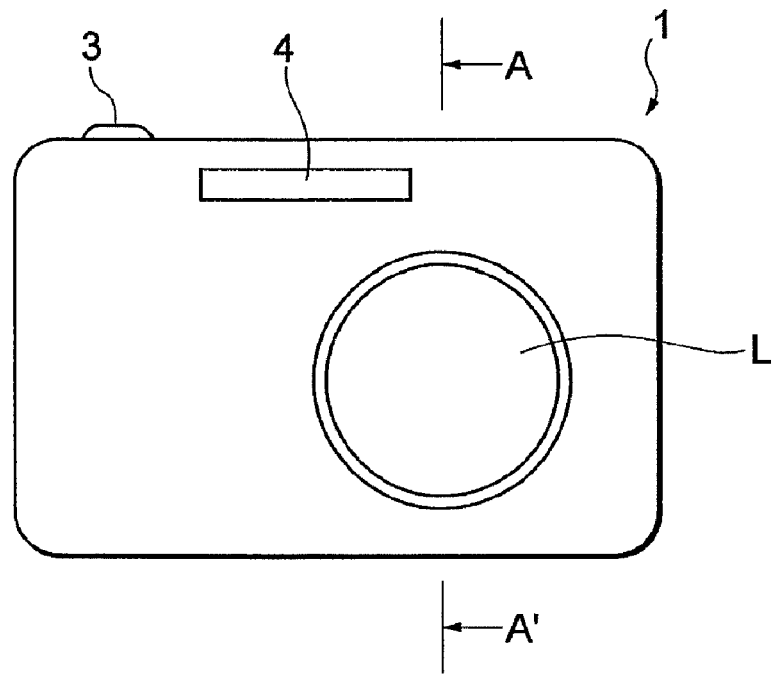
FIG. 15A is a front view and FIG. 15B is a rear view.
Figure 15B:
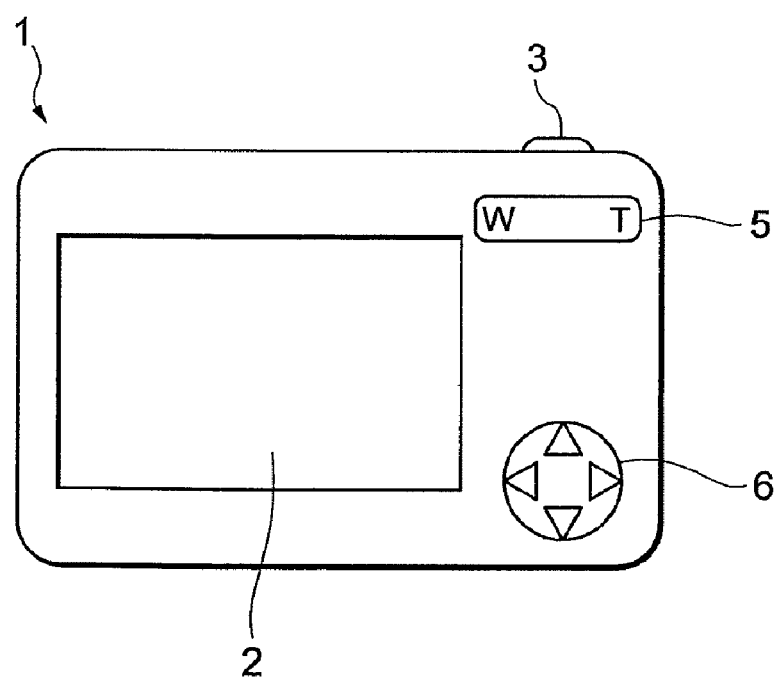
Figure 16:
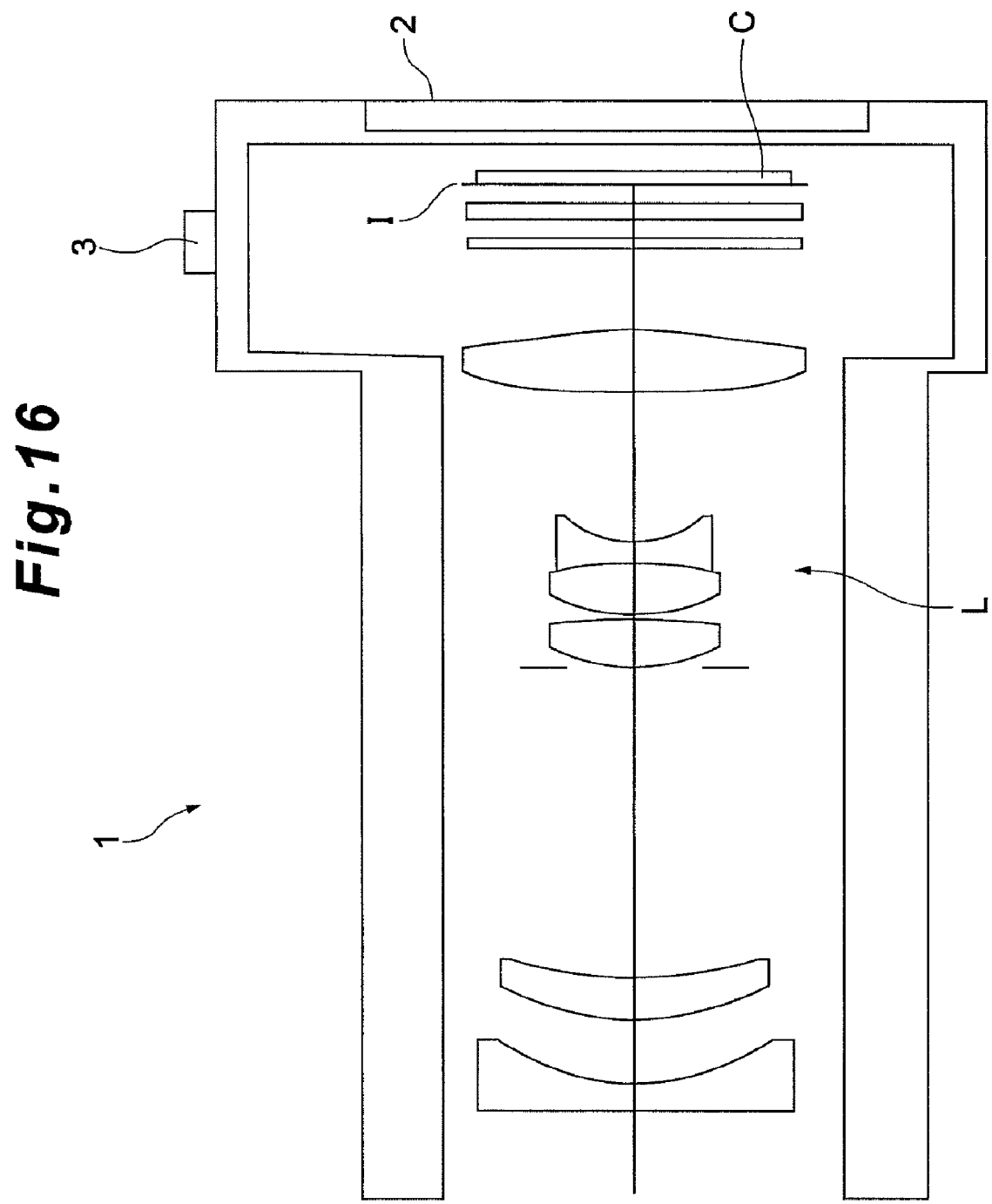
FIG. 16 is a cross-sectional view sectioned along the A-A' line in FIG. 15A.

FIG. 15 and FIG. 16 show a configuration of a digital still camera 1, as an optical apparatus equipping the zoom lens having the Above mentioned configuration as an imaging lens L. When a power button, which is not illustrated, of this digital still camera 1 is pressed, a shutter, which is not illustrated, is opened, lights from an object, which is not illustrated, are condensed by the zoom lens ZL, and an image is formed on an image sensing element C (e.g. film, CCD, CMOS) disposed on the imaging plane I. The object image formed on the image sensing element C is disposed on the liquid crystal monitor 2 disposed on the back of the camera 1. The user determines the composition of the object image by viewing the liquid crystal monitor 2, then presses the release button 3 down. Then the object image is shot by the image sensing element C, and is recorded and stored in a memory, which is not illustrated.

In this digital still camera 1, an auxiliary light emission unit 4 for emitting auxiliary light when the object is dark, a wide (W)-tele (T) button 5 used for zooming the imaging lens L from the wide-angle end state (W) to the telephoto end state (T), and function buttons 6 to be used for setting various conditions of the digital still camera 1, are disposed. The imaging lens L may be a replaceable lens, which is detachable from the camera body.

Figure 17:
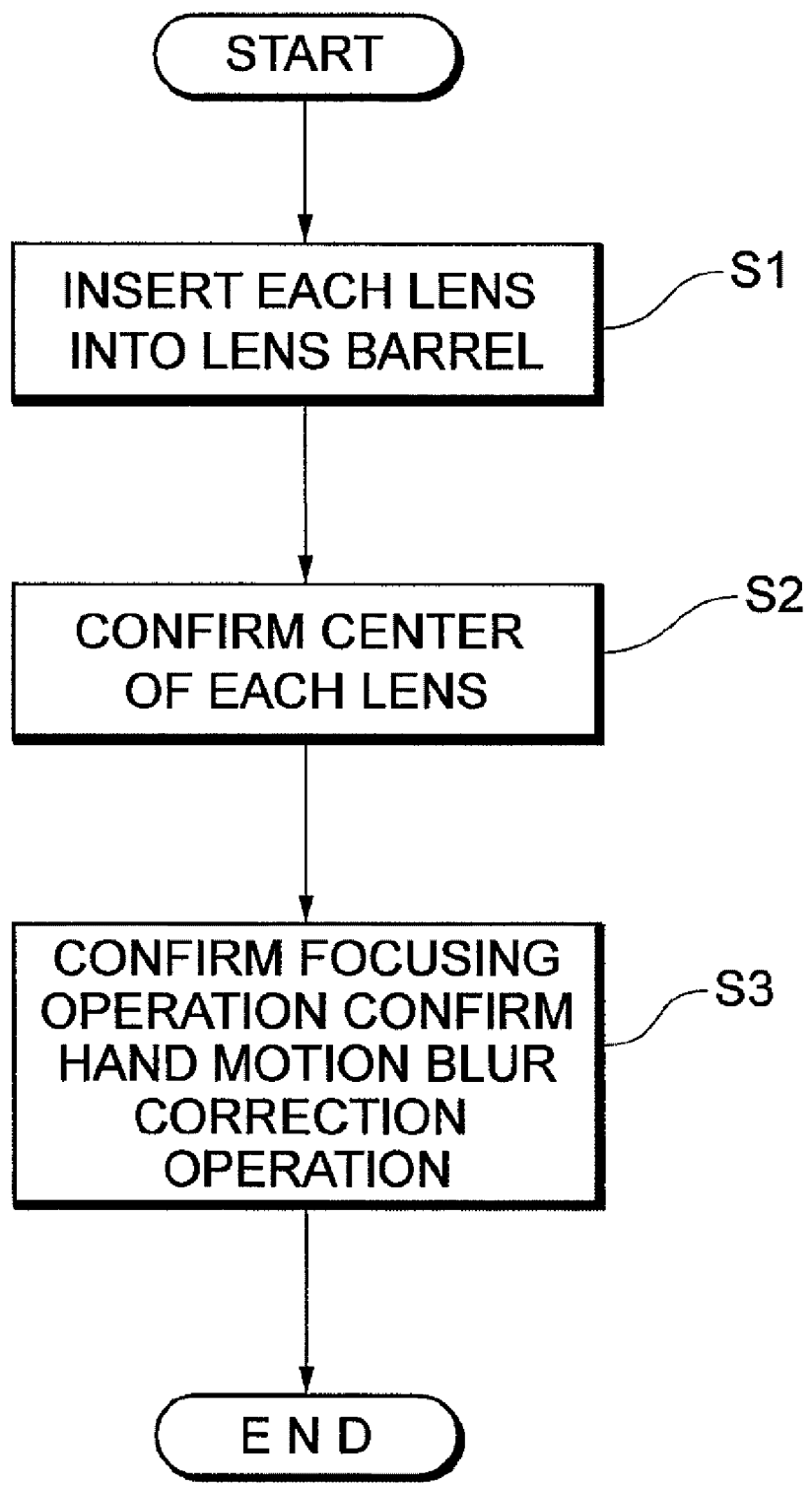
FIG. 17 is a flow chart depicting a manufacturing method for an imaging lens according to the present embodiment.

Now a manufacturing method for the imaging lens having the above configuration will be described with reference to FIG. 17. First each lens (lenses L11 to L13 in the present embodiment) is inserted into a cylindrical lens barrel (step S1). When the lenses are inserted into the lens barrel, each lens may be inserted into the lens barrel one at a time in a sequence along the optical axis, or a part or all of the lenses may be integrated and held by a holding element, and assembled with the lens barrel element. After each lens is inserted into the lens barrel, it is confirmed whether an image of an object is formed, that is, whether the center of each lens is aligned, in a state where each lens is inserted in the lens barrel (step S2). Then various operations of the imaging lens are confirmed (step S3). Examples of the various operations are a focusing operation in which lenses for focusing from a distant object to a close object move along the optical axis, and a motion blur correction operation in which at least a part of the lenses move so as to have components perpendicular to the optical axis. The sequence of confirming each operation is arbitrary.

Figure 18:
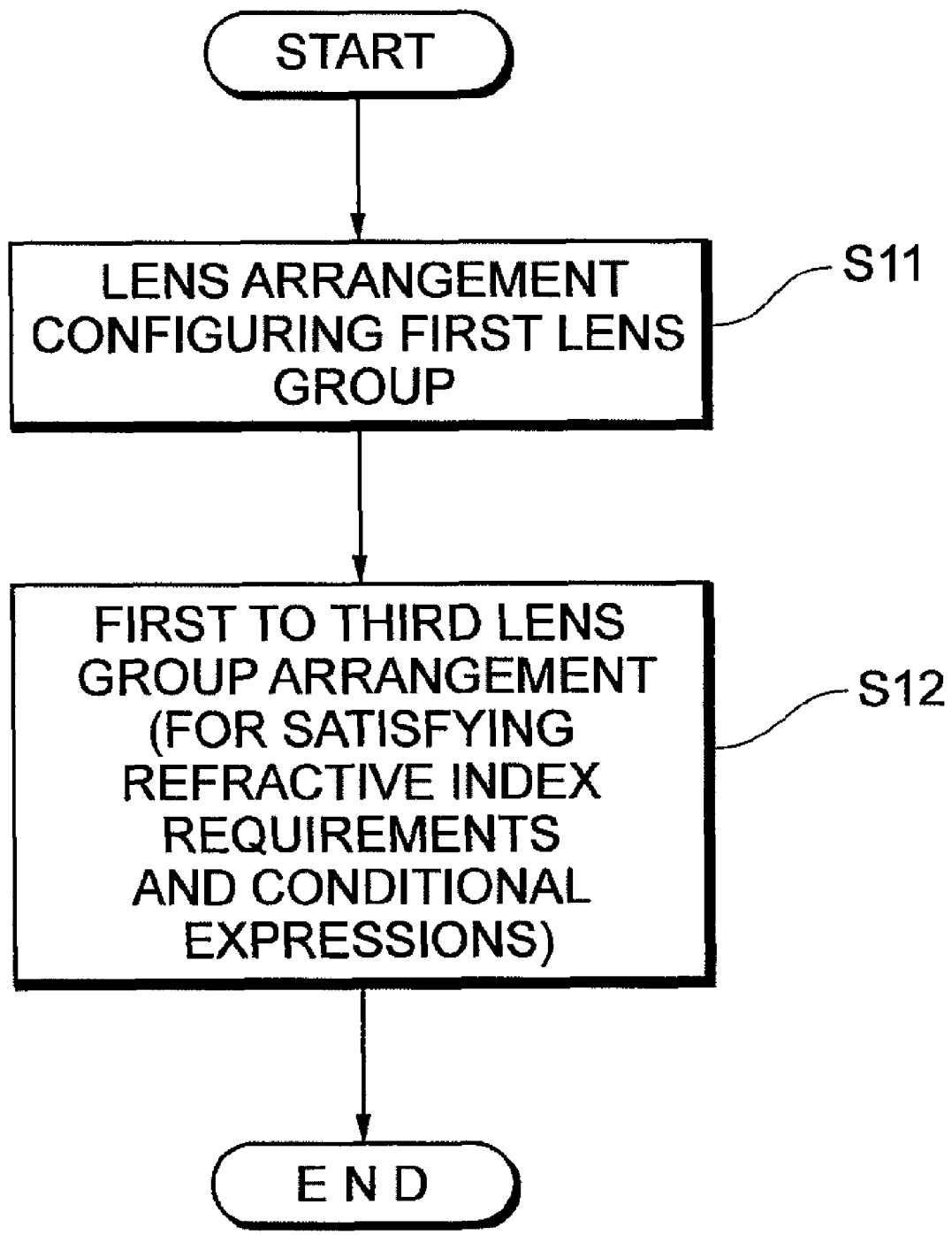
FIG. 18 is a flow chart depicting a manufacturing method for a zoom lens according to the present embodiment.

Now an outline of a manufacturing method for a zoom lens comprising, in order from an object, a first lens group G1, a second lens group G2 and a third lens group G3 will be described with reference to FIG. 18.

In this manufacturing method, first one spherical negative lens L11 and one spherical positive lens L12 are disposed with an air space there between as the first lens group G1 (step S11). Then each lens is disposed so as to satisfy the following conditional expression (1), so that the first lens group G1 has negative refractive power, the second lens group G2 has positive refractive power, and the third lens group G3 has positive refractive power (step S12). The conditional expression (1), described above, is as follows:

$$0.50 < (DG1+DG2+DG3)/fw < 1.75 \quad (1)$$

where DG1 denotes a thickness of the first lens group on the optical axis, DG2 denotes a thickness of the second lens group on the optical axis, DG3 denotes a thickness of the third lens group on the optical axis, and fw denotes a focal length of the zoom lens in the wide-angle end state.

EXAMPLES

Each example according to the present embodiment will now be described with reference to the drawings. Table 1 to Table 6 shown below are tables of each parameter according to Example 1 to Example 6. In [lens data], a surface number is a sequence of the lens surface from the object side along the light traveling direction, r is a radius of curvature of each lens surface, d is a surface distance which is a distance from each optical plane to the next optical plane (or imaging plane), nd is a refractive index with respect to the d-line (wavelength: 587.6 nm), and vd is an Abbe number with respect to d-line. If this lens surface is aspherical, the surface number is marked with an "*", and a paraxial radius of curvature is shown in the column of the radius of curvature r. "∞" of the radius of curvature shows a plane or an aperture. The refractive index "1.00000" of air is omitted.

In [all parameters], f is a focal length of the zoom lens. Fno is an F number, ω is a half angle view, and y is an image height. Bf is a back focus, and TL is a total lens length. Bf and TL are indicated as values converted into air length from the final surface of the lens to the imaging plane.

In [aspherical data], the shape of the aspherical surface in the [lens data] is shown by the following expression (a). In other words, the following expression (a) is used, where y denotes the height in the direction perpendicular to the optical axis, S(y) denotes a distance (sag amount) along the optical axis from the tangential plane at the vertex of the aspherical surface to the position on the aspherical surface at height y, r denotes a radius of curvature (paraxial radius of curvature) of the reference spherical surface, κ denotes a conical coefficient, and An denotes an aspherical coefficient of degree n. In each example, an aspherical coefficient A2 of degree 2 is 0, which is omitted. "E-n" (n: integer) indicates "×10$^{-n}$". For example, 1.234E-05=1.234×10$^{-5}$.

$$S(y)=(y^2/r)/\{1+(1-\kappa \cdot y^2/r^2)^{1/2}\}+A4 \times y^4+A6 \times y^6+A8 \times y^8+A10 \times y^{10} \quad (a)$$

In [variable distance data], f is a focal length of the zoom lens, Di (i is an integer) is a variable surface distance on the i-th surface.

[Lens group data] shows the first surface and focal length of each lens group.

In [the conditional expression], values corresponding to the above mentioned conditional expressions (1) to (7) are shown.

In the tables, normally "mm" is used for the unit of focal length f, radius of curvature r, surface distance d and other lengths. The unit of the optical system, however, is not limited to "mm", but can be other appropriate units since an equivalent optical performance can be acquired even if the optical system is proportionally expanded or proportionally reduced.

This description on the tables is the same for other examples, and therefore description thereof is omitted.

Example 1

Example 1 will now be described with reference to FIG. 1, FIG. 2 and Table 1. FIG. 1 shows a configuration of the zoom lens according to Example 1, and the zoom locus thereof. As FIG. 1 shows, the zoom lens according to Example 1 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a biconvex plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2 and the aperture stop S move, and the third lens group G3 is always fixed.

Table 1 shows a table of each parameter in Example 1. The surface numbers 1 to 16 in Table 1 correspond to the surfaces 1 to 16 in FIG. 1. In Example 1, the sixth, seventh, eleventh and twelfth lens surfaces all have aspherical shapes.

TABLE 1

| [Lens data] | | | | |
|---|---|---|---|---|
| surface number | r | d | nd | vd |
| 1 | 318.4573 | 0.8 | 1.8160 | 46.6 |
| 2 | 6.508 | 1.8 | | |
| 3 | 7.6276 | 1.2 | 1.8467 | 23.8 |
| 4 | 11.5192 | (D4) | | |
| 5 | ∞ | 0.0 | (Aperture stop S) | |
| *6 | 4.9722 | 1.4 | 1.5891 | 61.2 |
| *7 | -14.4512 | 0.1 | | |
| 8 | 5.328 | 1.5 | 1.7292 | 54.7 |
| 9 | -9.7893 | 0.6 | 1.8010 | 35.0 |
| 10 | 2.8699 | (D10) | | |
| *11 | 196.1714 | 1.8 | 1.5327 | 56.2 |
| *12 | -10.6332 | 2.34 | | |
| 13 | ∞ | 0.3 | 1.5444 | 70.5 |
| 14 | ∞ | 0.5 | | |
| 15 | ∞ | 0.5 | 1.5163 | 64.1 |
| 16 | ∞ | 0.5 | | |

| [All parameters] | | | | |
|---|---|---|---|---|
| | wide-angle end | | intermediate focal length | | telephoto end |
| f | 6.87 | ~ | 11.56 | ~ | 19.44 |
| Fno | 3.4 | ~ | 4.5 | ~ | 6.3 |
| ω | 32.2 | ~ | 19.3 | ~ | 11.9 |
| y | 4.050 | ~ | 4.050 | ~ | 4.050 |
| Bf | 3.86 | ~ | 3.86 | ~ | 3.86 |
| TL | 26.36 | ~ | 24.96 | ~ | 28.33 |

TABLE 1-continued

[Spherical data]

sixth surface $\kappa = -0.51, A4 = +4.9469E-04, A6 = -2.3989E-06,$
$A8 = 0.0000E+00, A10 = 0.0000E+00$ seventh surface $\kappa = +8.49, A4 = +5.1933E-04, A6 = +1.3172E-05,$
$A8 = 0.0000E+00, A10 = 0.0000E+00$ eleventh surface $\kappa = +1.00, A4 = +1.6081E-03, A6 = -2.6354E-05,$
$A8 = 0.0000E+00, A10 = 0.0000E+00$ twelfth surface $\kappa = +1.00, A4 = +2.1420E-03, A6 = -4.3613E-05,$
$A8 = 0.0000E+00, A10 = 0.0000E+00$

[Variable distance data]

| variable distance | wide-angle end | intermediate focal length | telephoto end |
|---|---|---|---|
| D4 | 8.99 | 3.74 | 0.63 |
| D10 | 4.30 | 8.16 | 14.64 |

[Lens group data]

| group No. | first surface group | focal length group |
|---|---|---|
| G1 | 1 | −13.1 |
| G2 | 6 | 8.6 |
| G3 | 11 | 19.0 |

[Conditional expressions]

conditional expression (1): (DG1 + DG2 + DG3)/fw = 1.34
conditional expression (2): (R2 − R3)/(R2 + R3) = −0.079
conditional expression (3): (−f1)/ft = 0.67
conditional expression (4): f2/ft = 0.44
conditional expression (5): f3/fw = 2.76
conditional expression (6): d2/(−f1) = 0.14
conditional expression (7): S = 4.92

As the table of parameters in Table 1 shows, the zoom lens according to Example 1 satisfies all the above conditional expressions (1) to (7).

FIG. 2 shows graphs of various aberrations (spherical aberration, astigmatism, distortion, lateral chromatic aberration and coma aberration) of Example 1, where FIG. 2A are graphs showing various aberrations upon focusing on infinity in the wide-angle end state, FIG. 2B are graphs showing various aberrations upon focusing on infinity in the intermediate focal length state, and FIG. 2C are graphs showing various aberrations upon focusing on infinity in the telephoto end state. In each graph showing various aberrations, FNO denotes an F number and A denotes a field angle. In the graph showing spherical aberrations, the solid line indicates spherical aberration, and the broken line indicates the sine condition. In the graph showing astigmatism, the solid line indicates a sagittal imaging plane, and the broken line indicates a meridional imaging plane. The graph showing coma aberration shows a meridional coma. Further, d shows various aberrations with respect to the d-line (wavelength: 587.6 nm), g shows various aberrations with respect to the g-line (wavelength: 435.8 nm), and no indicates shows various aberrations with respect to the d-line respectively. This description on graphs regarding aberrations is the same for other examples, and therefore description is omitted respectively.

As seen in each graph showing various aberrations, in Example 1, various aberrations are appropriately corrected in each focal length state from the wide-angle end state to the telephoto end state, therefore an excellent optical performance can be implemented.

Example 2

Figure 3:
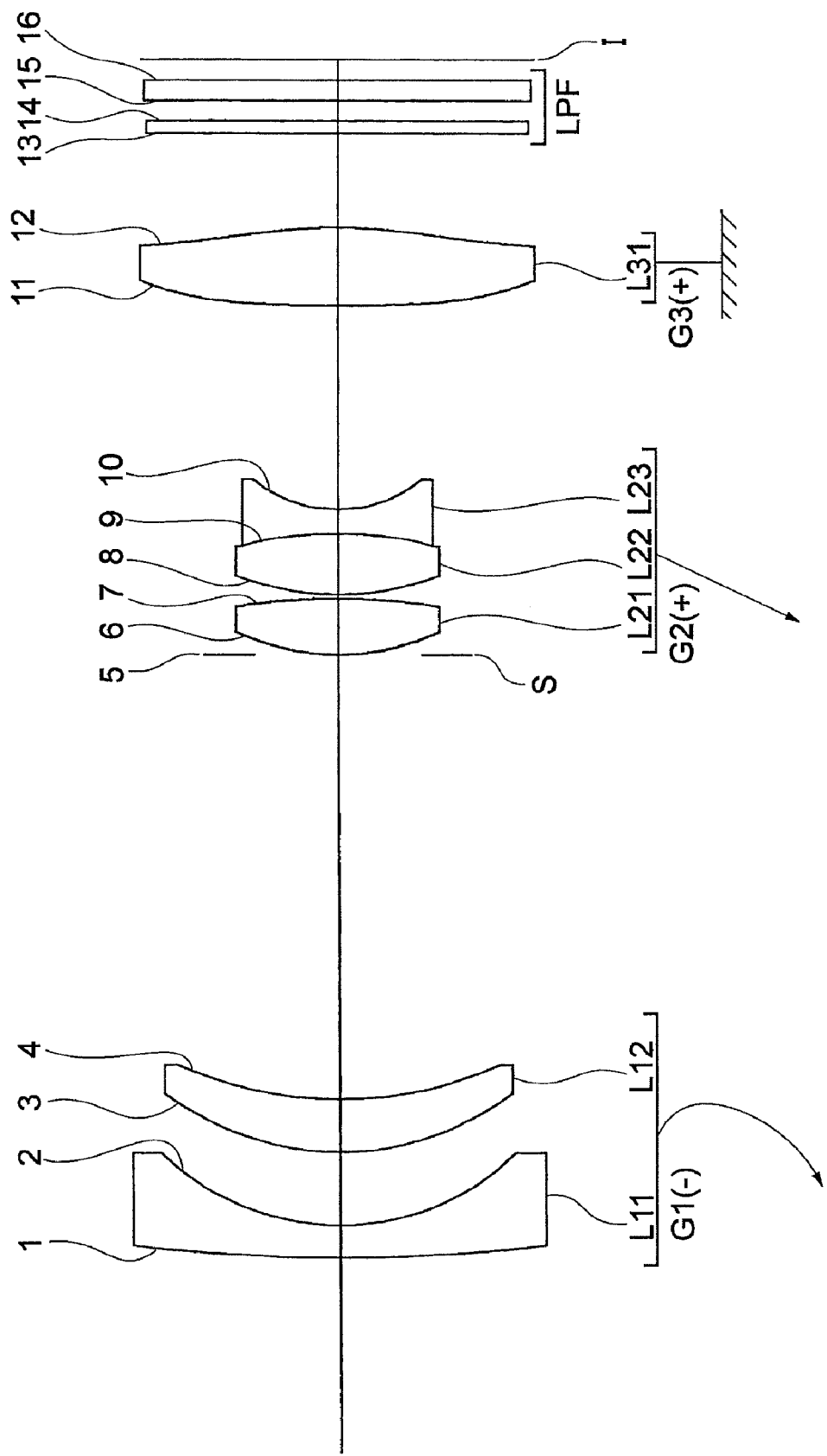
FIG. 3 is a diagram depicting a configuration and zoom locus of the zoom lens according to Example 2.

Example 2 will now be described with reference to FIG. 3, FIG. 4 and Table 2. FIG. 3 shows a configuration of the zoom lens according to Example 2, and the zoom locus thereof. As FIG. 3 shows, the zoom lens according to Example 2 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a biconvex plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2 and the aperture stop S move, and the third lens group G3 is always fixed.

Table 2 shows a table of each parameter in Example 2. The surface numbers 1 to 16 in Table 2 correspond to the surfaces 1 to 16 in FIG. 3. In Example 2, the sixth, seventh, eleventh and twelfth lens surfaces all have aspherical shapes.

TABLE 2

[Lens data]

| surface number | r | d | nd | vd |
|---|---|---|---|---|
| 1 | 42.2063 | 0.8 | 1.8160 | 46.6 |
| 2 | 6.0003 | 1.8 | | |
| 3 | 6.7256 | 1.3 | 1.8467 | 23.8 |
| 4 | 9.2556 | (D4) | | |
| 5 | ∞ | 0.0 | (Aperture stop S) | |
| *6 | 5.0409 | 1.4 | 1.5920 | 67.1 |
| *7 | −15.4552 | 0.1 | | |
| 8 | 6.6848 | 1.5 | 1.8040 | 46.6 |
| 9 | −8.6299 | 0.6 | 1.8010 | 35.0 |
| 10 | 3.1049 | (D10) | | |
| *11 | 138.9665 | 1.9 | 1.5327 | 56.2 |
| *12 | −10.8596 | 2.3 | | |
| 13 | ∞ | 0.3 | 1.5444 | 70.5 |
| 14 | ∞ | 0.5 | | |
| 15 | ∞ | 0.5 | 1.5163 | 64.1 |
| 16 | ∞ | 0.5 | | |

TABLE 2-continued

[All parameters]

| | wide-angle end | | intermediate focal length | | telephoto end |
|---|---|---|---|---|---|
| f | 6.87 | ~ | 12.52 | ~ | 22.73 |
| Fno | 3.4 | ~ | 4.7 | ~ | 7.0 |
| ω | 32.2 | ~ | 17.9 | ~ | 10.2 |
| y | 4.050 | ~ | 4.050 | ~ | 4.050 |
| Bf | 3.83 | ~ | 3.83 | ~ | 3.83 |
| TL | 29.33 | ~ | 27.37 | ~ | 32.27 |

[Spherical data]

sixth surface $\kappa = -0.11, A4 = -5.0227E-05, A6 = -7.0139E-05,$
$A8 = 0.0000E+00, A10 = 0.0000E+00$ seventh surface $\kappa = -1.27, A4 = +7.1409E-05, A6 = -6.6841E-05,$
$A8 = 0.0000E+00, A10 = 0.0000E+00$ eleventh surface $\kappa = +1.00, A4 = +1.2722E-03, A6 = -1.1511E-05,$
$A8 = 0.0000E+00, A10 = 0.0000E+00$ twelfth surface $\kappa = +1.00, A4 = +1.8659E-03, A6 = -2.7555E-05,$
$A8 = 0.0000E+00, A10 = 0.0000E+00$

[Variable distance data]

| variable distance | wide-angle end | intermediate focal length | telephoto end |
|---|---|---|---|
| D4 | 11.06 | 4.36 | 0.70 |
| D10 | 5.04 | 9.77 | 18.34 |

[Lens group data]

| group No. | first surface group | focal length group |
|---|---|---|
| G1 | 1 | -13.9 |
| G2 | 6 | 9.3 |
| G3 | 11 | 19.0 |

[Conditional expressions]

conditional expression (1): (DG1 + DG2 + DG3)/fw = 1.37
conditional expression (2): (R2 – R3)/(R2 + R3) = –0.057
conditional expression (3): (–f1)/ft = 0.61
conditional expression (4): f2/ft = 0.41
conditional expression (5): f3/fw = 2.76
conditional expression (6): d2/(–f1) = 0.13
conditional expression (7): S = 6.32

As the table of parameters in Table 2 shows, the zoom lens according to Example 2 satisfies all the above conditional expressions (1) to (7).

Figure 4A:
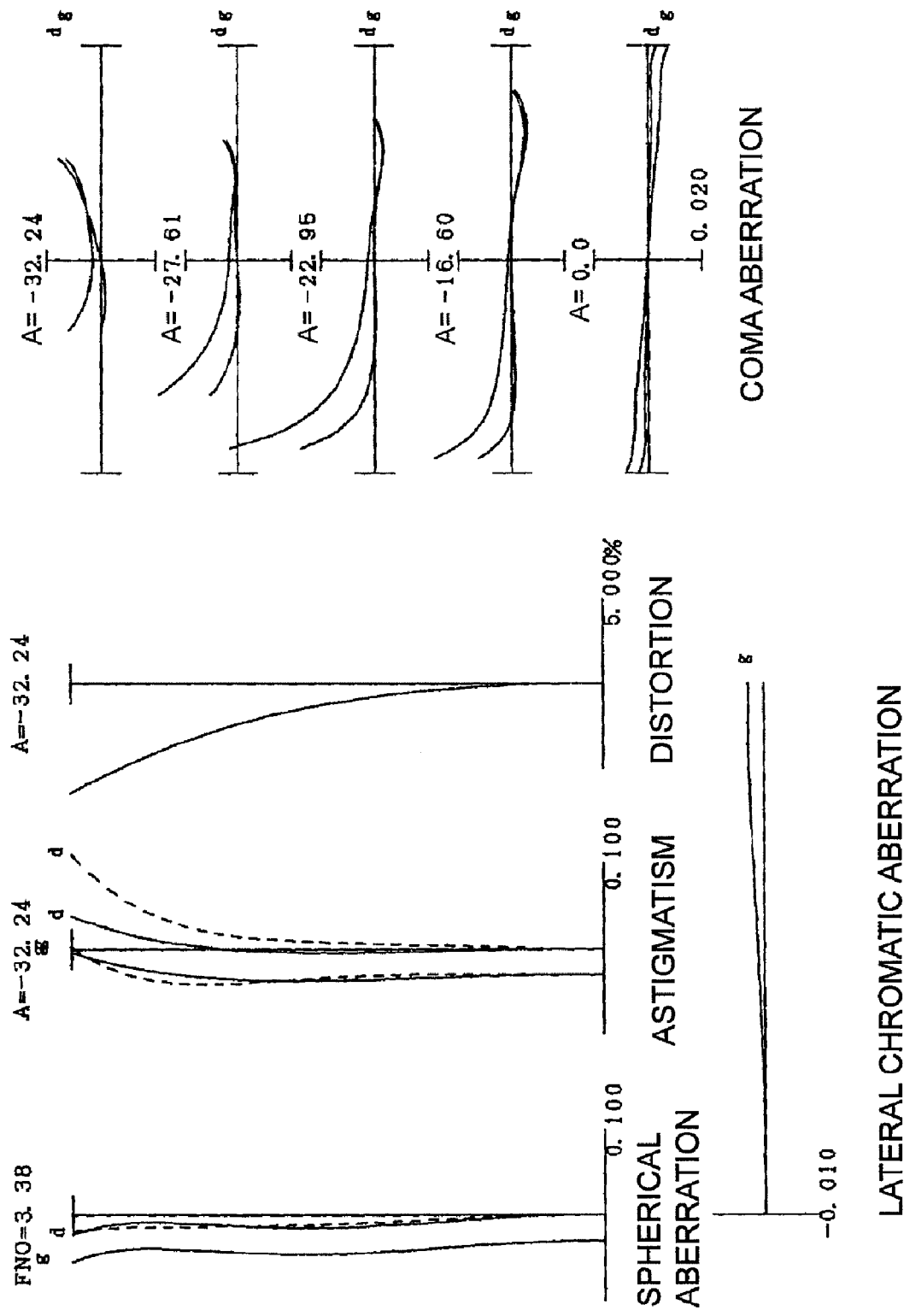
FIG. 4 are graphs showing various aberrations of the zoom lens according to Example 2, where FIG. 4A are graphs showing various aberrations upon focusing on infinity in the wide-angle end state, FIG. 4B are graphs showing various aberrations upon focusing on infinity in the intermediate focal length state, and FIG. 4C are graphs showing various aberrations upon focusing on infinity in the telephoto end state.
Figure 4B:
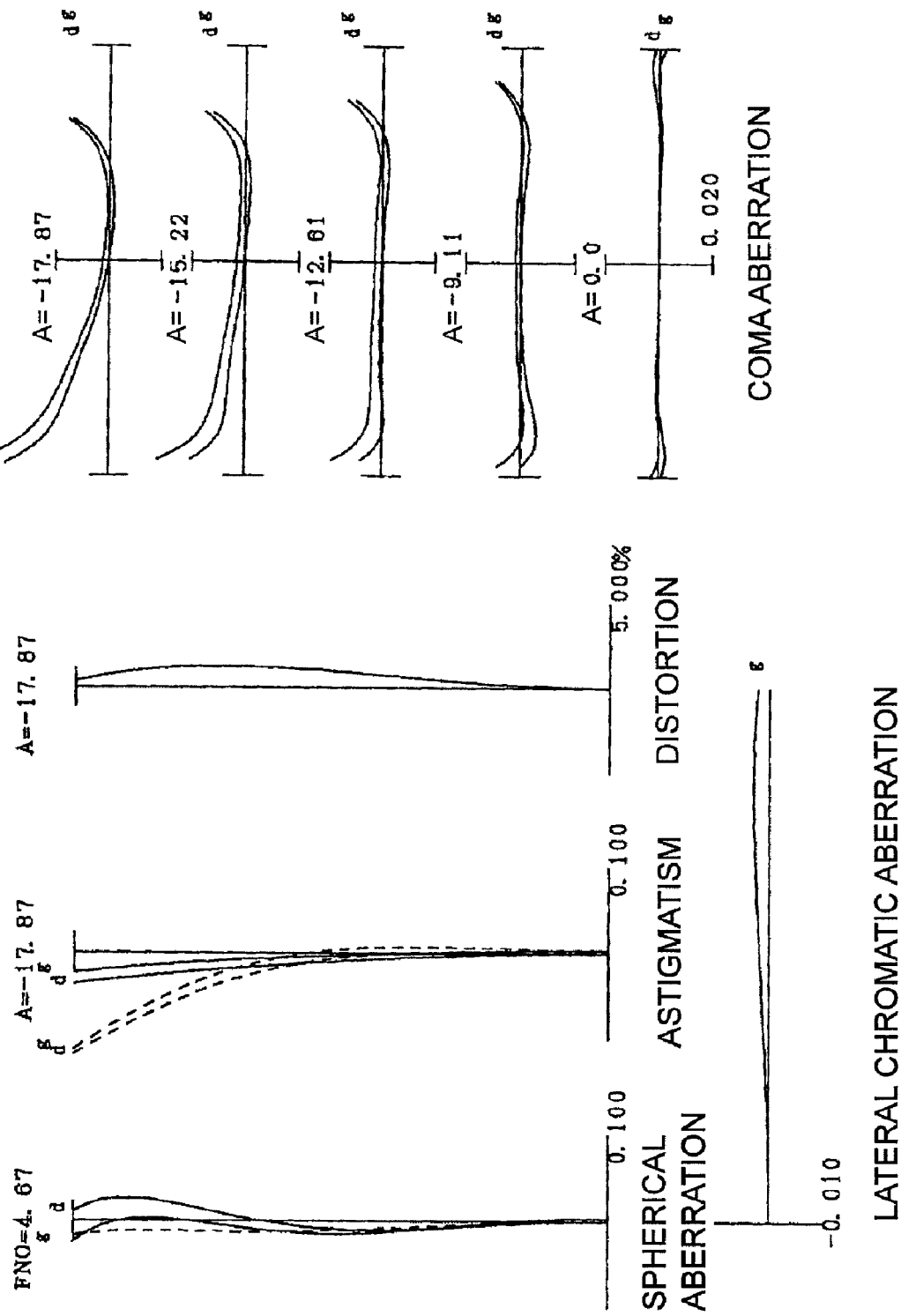

FIG. 4 shows graphs of various aberrations (spherical aberration, astigmatism, distortion, lateral chromatic aberration and coma aberration) of Example 2, where FIG. 4A are graphs showing various aberrations upon focusing on infinity in the wide-angle end state, FIG. 4B are graphs showing various aberrations upon focusing on infinity in the intermediate focal length state, and FIG. 4C are graphs showing various aberrations upon focusing on infinity in the telephoto end state. As seen in the graphs showing each aberration, according to Example 2, various aberrations in each focal length state from the wide-angle end state to the telephoto end state can be appropriately corrected, and an excellent optical performance can be implemented.

Example 3

Example 3 will now be described with reference to FIG. 5, FIG. 6 and Table 3. FIG. 5 shows a configuration of the zoom lens according to Example 3, and the zoom locus thereof. As FIG. 5 shows, the zoom lens according to Example 3 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a biconvex plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2, the aperture stop S and the third lens group G3 move.

Table 3 shows a table of each parameter in Example 3. The surface numbers 1 to 16 in Table 3 correspond to the surfaces 1 to 16 in FIG. 5. In Example 3, the eighth, eleventh and twelfth lens surfaces all have aspherical shapes.

TABLE 3

[Lens data]

| surface number | r | d | nd | νd |
|---|---|---|---|---|
| 1 | -88.3042 | 0.8 | 1.7432 | 49.3 |
| 2 | 7.7725 | 1.8 | | |
| 3 | 8.2381 | 1.2 | 1.8467 | 23.8 |
| 4 | 11.7886 | (D4) | | |
| 5 | ∞ | 0.0 | (Aperture stop S) | |
| 6 | 4.0548 | 1.4 | 1.5168 | 64.1 |
| 7 | -24.8543 | 0.1 | | |
| *8 | 5.463 | 1.5 | 1.7680 | 49.2 |
| 9 | -6.9066 | 0.6 | 1.8010 | 35.0 |
| 10 | 2.8829 | (D10) | | |
| *11 | -101.3436 | 1.8 | 1.5327 | 56.2 |
| *12 | -8.669 | (D12) | | |
| 13 | ∞ | 0.3 | 1.5444 | 70.5 |
| 14 | ∞ | 0.4 | | |
| 15 | ∞ | 0.5 | 1.5163 | 64.1 |
| 16 | ∞ | 0.6 | | |

[All parameters]

| | wide-angle end | | intermediate focal length | | telephoto end |
|---|---|---|---|---|---|
| f | 6.87 | ~ | 11.56 | ~ | 19.38 |
| Fno | 3.3 | ~ | 4.4 | ~ | 6.1 |
| ω | 32.2 | ~ | 19.4 | ~ | 12.1 |
| y | 4.050 | ~ | 4.050 | ~ | 4.050 |

TABLE 3-continued

| Bf | 4.17 | ~ | 3.95 | ~ | 3.95 |
|---|---|---|---|---|---|
| TL | 27.18 | ~ | 24.84 | ~ | 27.14 |

[Spherical data]

eighth surface $\kappa$ = +1.00, A4 = +1.7153E−03, A6 = −3.0706E−05,
A8 = +1.0000E−15, A10 = +1.0000E−15 eleventh surface $\kappa$ = +1.00, A4 = +2.1913E−03, A6 = −4.3448E−05,
A8 = +1.0000E−15, A10 = +1.0000E−15 twelfth surface $\kappa$ = +1.00, A4 = −1.6026E−03, A6 = −1.7026E−04,
A8 = 0.0000E+00, A10 = 0.0000E+00

[Variable distance data]

| variable distance | wide-angle end | intermediate focal length | telephoto end |
|---|---|---|---|
| D4 | 10.05 | 4.05 | 0.37 |
| D10 | 3.76 | 7.63 | 13.62 |
| D12 | 2.64 | 2.43 | 2.43 |

[Lens group data]

| group No. | first surface group | focal length group |
|---|---|---|
| G1 | 1 | −15.0 |
| G2 | 6 | 9.0 |
| G3 | 11 | 17.7 |

[Conditional expressions]

conditional expression (1): (DG1 + DG2 + DG3)/fw = 1.34
conditional expression (2): (R2 − R3)/(R2 + R3) = −0.029
conditional expression (3): (−f1)/ft = 0.77
conditional expression (4): f2/ft = 0.46
conditional expression (5): f3/fw = 2.57
conditional expression (6): d2/(−f1) = 0.12
conditional expression (7): S = 5.64

As the table of parameters in Table 3 shows, the zoom lens according to Example 3 satisfies all the above conditional expressions (1) to (7).

Figure 6A:
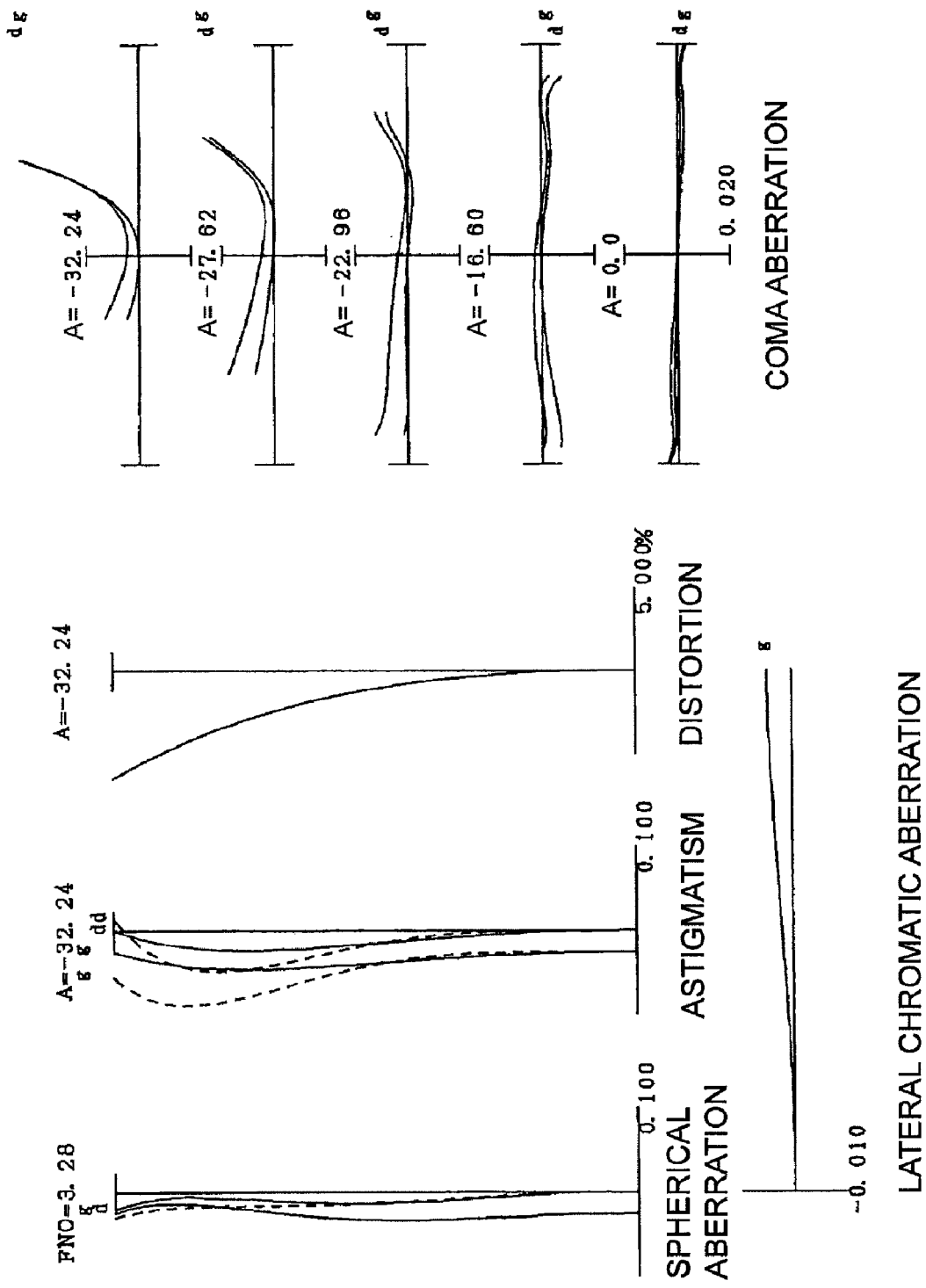
FIG. 6 are graphs showing various aberrations of the zoom lens according to Example 3, where FIG. 6A are graphs showing various aberrations upon focusing on infinity in the wide-angle end state, FIG. 6B are graphs showing various aberrations upon focusing on infinity in the intermediate focal length state, and FIG. 6C are graphs showing various aberrations upon focusing on infinity in the telephoto end state.
Figure 6B:
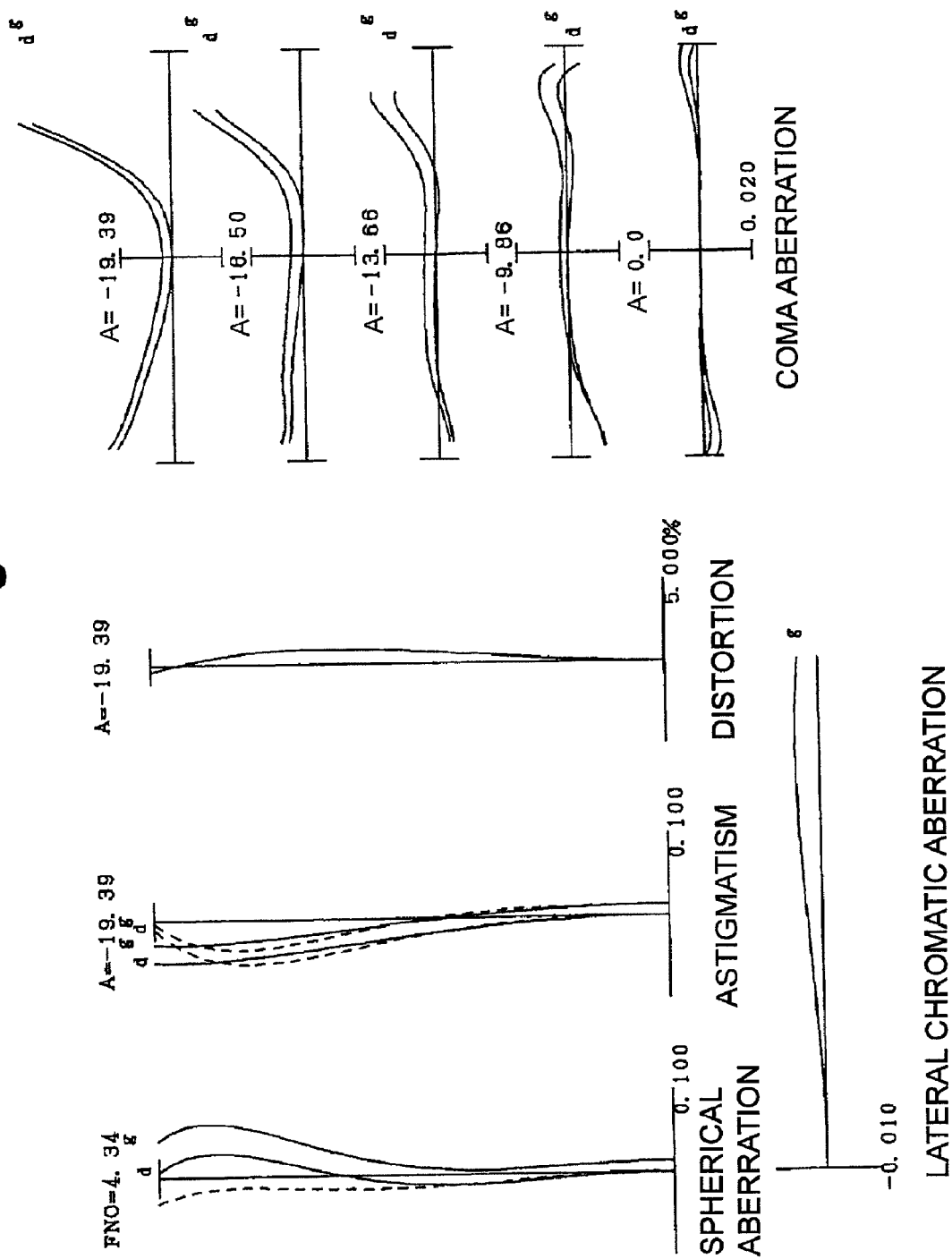
Figure 6C:
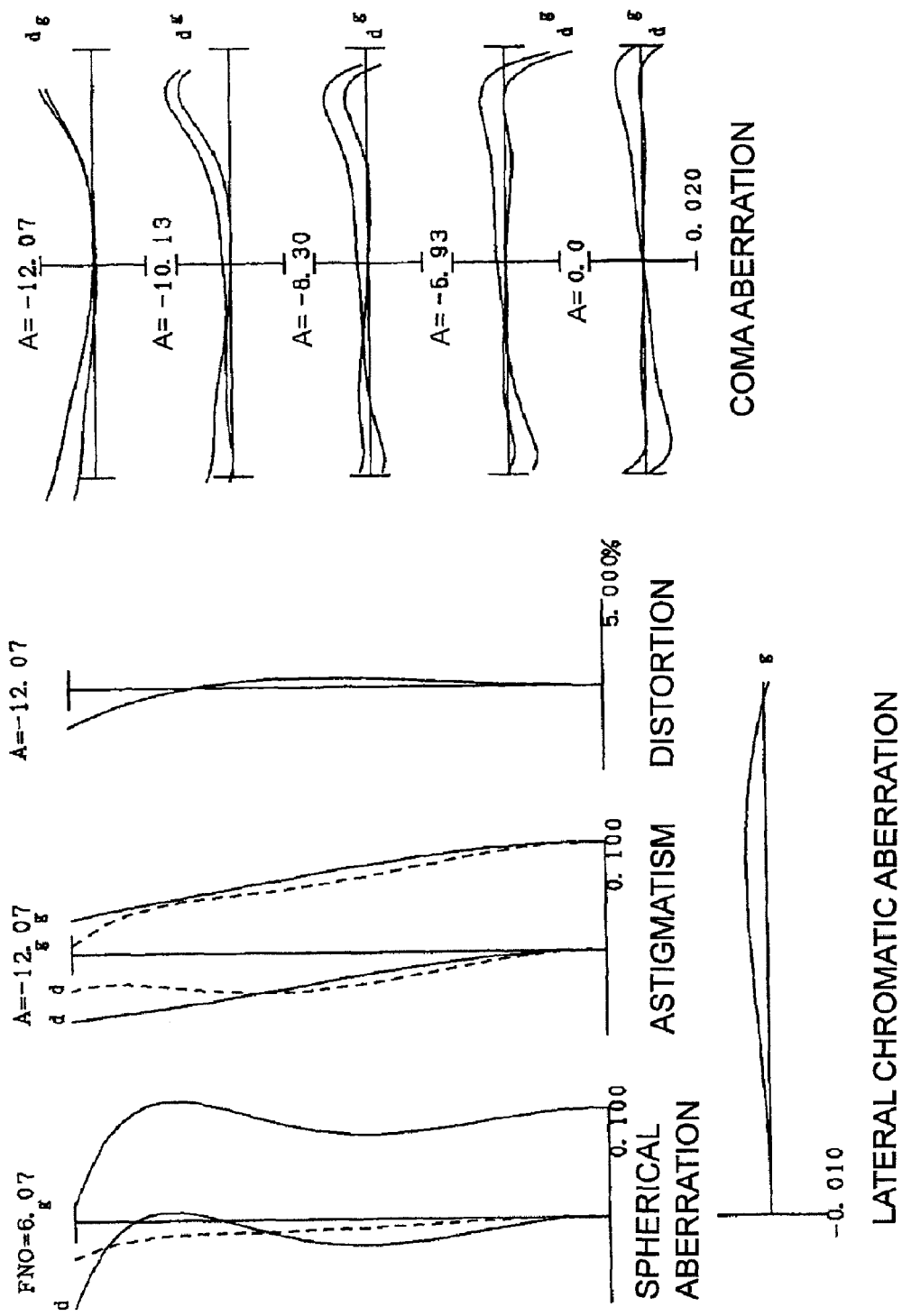

FIG. 6 shows graphs of various aberrations (spherical aberration, astigmatism, distortion, lateral chromatic aberration and coma aberration) of Example 3, where FIG. 6A are graphs showing various aberrations upon focusing on infinity in the wide-angle end state, FIG. 6B are graphs showing various aberrations upon focusing on infinity in the intermediate focal length state, and FIG. 6C are graphs showing various aberrations upon focusing on infinity in the telephoto end state. As seen in the graphs showing each aberration, according to Example 3, various aberrations in each focal length state from the wide-angle end state to the telephoto end state can be appropriately corrected, and an excellent optical performance can be implemented.

Example 4

Example 4 will now be described with reference to FIG. 7, FIG. 8 and Table 4. FIG. 7 shows a configuration of the zoom lens according to Example 4, and the zoom locus thereof. As FIG. 7 shows, the zoom lens according to Example 4 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a biconvex plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2 and the aperture stop S move, and the third lens group G3 is always fixed.

Table 4 shows a table of each parameter in Example 4. The surface numbers 1 to 16 in Table 4 correspond to the surfaces 1 to 16 in FIG. 7. In Example 4, the sixth, seventh, eleventh and twelfth lens surfaces all have aspherical shapes.

TABLE 4

[Lens data]

| surface number | r | d | nd | vd |
|---|---|---|---|---|
| 1 | 43.6197 | 0.8 | 1.7550 | 52.3 |
| 2 | 5.8208 | 2.0 | | |
| 3 | 6.2898 | 1.2 | 1.8467 | 23.8 |
| 4 | 7.7463 | (D4) | | |
| 5 | ∞ | 0.0 | (Aperture stop S) | |
| *6 | 5.6351 | 1.4 | 1.5891 | 61.2 |
| *7 | −17.3886 | 0.2 | | |
| 8 | 4.9282 | 1.5 | 1.7292 | 54.7 |
| 9 | −11.0829 | 0.5 | 1.8010 | 35.0 |
| 10 | 3.0545 | (D10) | | |
| *11 | 74.3455 | 1.8 | 1.5327 | 56.2 |
| *12 | −10.6382 | 2.8 | | |
| 13 | ∞ | 0.3 | 1.5444 | 70.5 |
| 14 | ∞ | 0.5 | | |
| 15 | ∞ | 0.5 | 1.5163 | 64.1 |
| 16 | ∞ | 0.5 | | |

[All parameters]

| | wide-angle end | intermediate focal length | telephoto end |
|---|---|---|---|
| f | 6.57 ~ | 11.04 ~ | 18.57 |
| Fno | 3.3 ~ | 4.3 ~ | 6.1 |
| ω | 33.4 ~ | 20.0 ~ | 12.2 |
| y | 4.050 | 4.050 | 4.050 |
| Bf | 4.36 ~ | 4.36 ~ | 4.36 |
| TL | 28.42 ~ | 27.21 ~ | 31.06 |

[Spherical data]

sixth surface $\kappa$ = −0.75, A4 = +6.8403E−04, A6 = −1.3098E−05,
A8 = 0.0000E+00, A10 = 0.0000E+00 seventh surface

TABLE 4-continued $\kappa$ = +7.40, A4 = +4.0542E-04, A6 = -5.5291E-06,
A8 = 0.0000E+00, A10 = 0.0000E+00
eleventh surface $\kappa$ = +1.00, A4 = +1.0613E-03, A6 = -5.8857-07,
A8 = 0.0000E+00, A10 = 0.0000E+00
twelfth surface $\kappa$ = +1.00, A4 = +1.6429E-03, A6 = -1.1810E-05,
A8 = 0.0000E+00, A10 = 0.0000E+00

[Variable distance data]

| variable distance | wide-angle end | intermediate focal length | telephoto end |
|---|---|---|---|
| D4 | 10.32 | 4.89 | 1.66 |
| D10 | 4.34 | 8.55 | 15.64 |

[Lens group data]

| group No. | first surface group | focal length group |
|---|---|---|
| G1 | 1 | -13.0 |
| G2 | 6 | 9.1 |
| G3 | 11 | 17.6 |

[Conditional expressions]

conditional expression (1): (DG1 + DG2 + DG3)/fw = 1.43
conditional expression (2): (R2 - R3)/(R2 + R3) = -0.038
conditional expression (3): (-f1)/ft = 0.70
conditional expression (4): f2/ft = 0.49
conditional expression (5): f3/fw = 2.68
conditional expression (6): d2/(-f1) = 0.15
conditional expression (7): S = 9.64

As the table of parameters in Table 4 shows, the zoom lens according to Example 4 satisfies all the above conditional expressions (1) to (7).

Figure 8A:
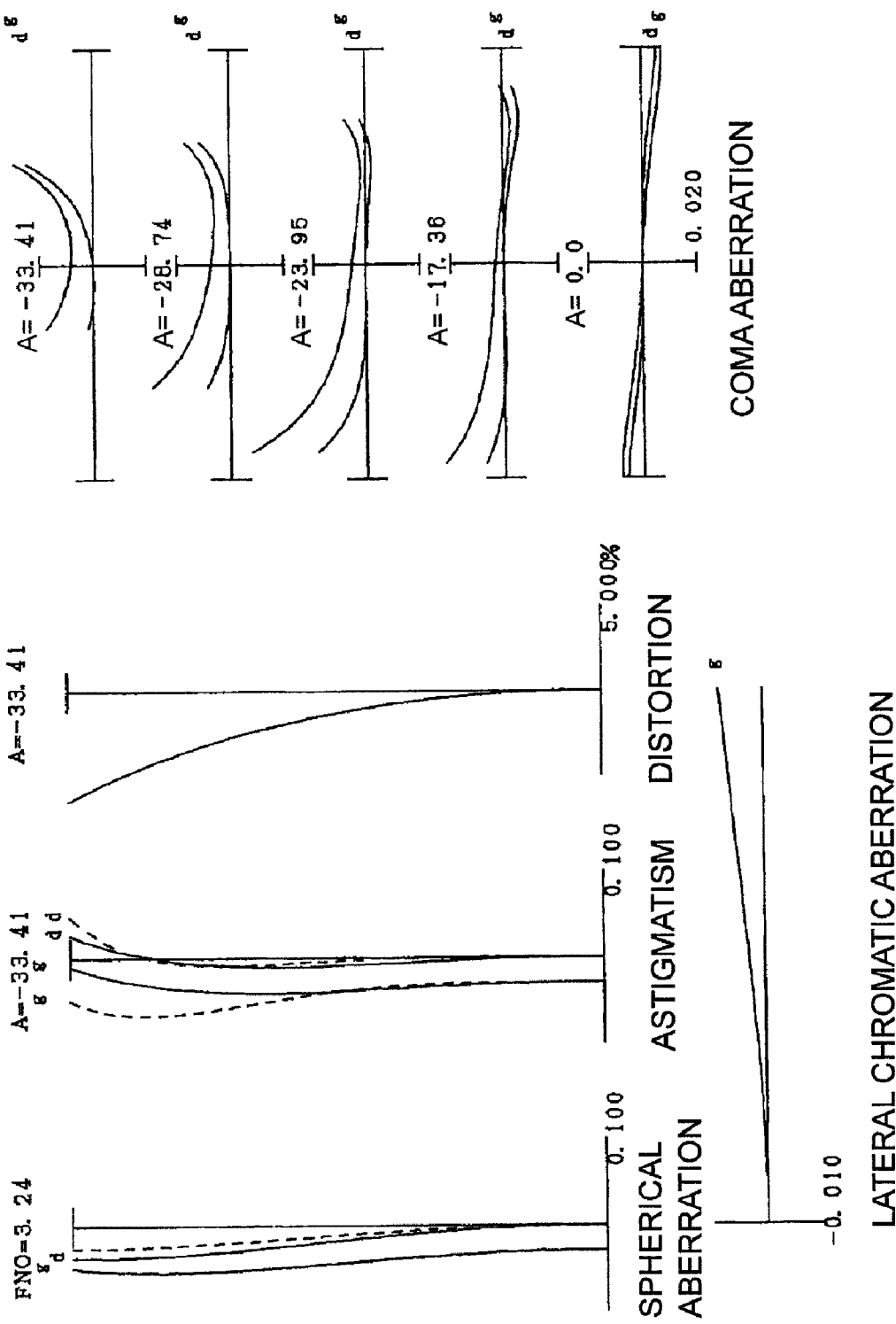
FIG. 8 are graphs showing various aberrations of the zoom lens according to Example 4, where FIG. 8A are graphs showing various Aberrations upon focusing on infinity in the wide-angle end state, FIG. 8B are graphs showing various aberrations upon focusing on infinity in the intermediate focal length state, and FIG. 8C are graphs showing various aberrations upon focusing on infinity in the telephoto end state.
Figure 8B:
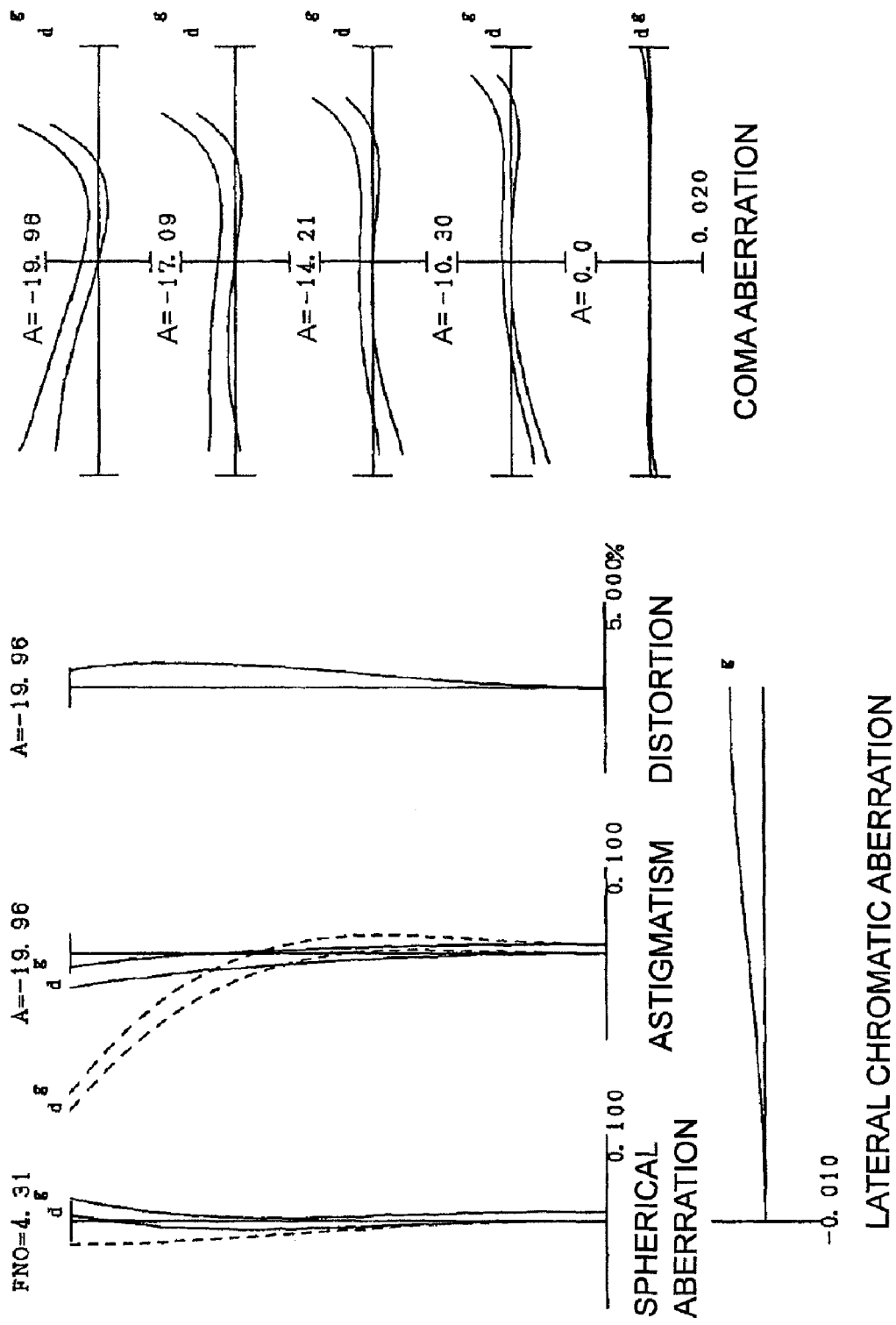
Figure 8C:
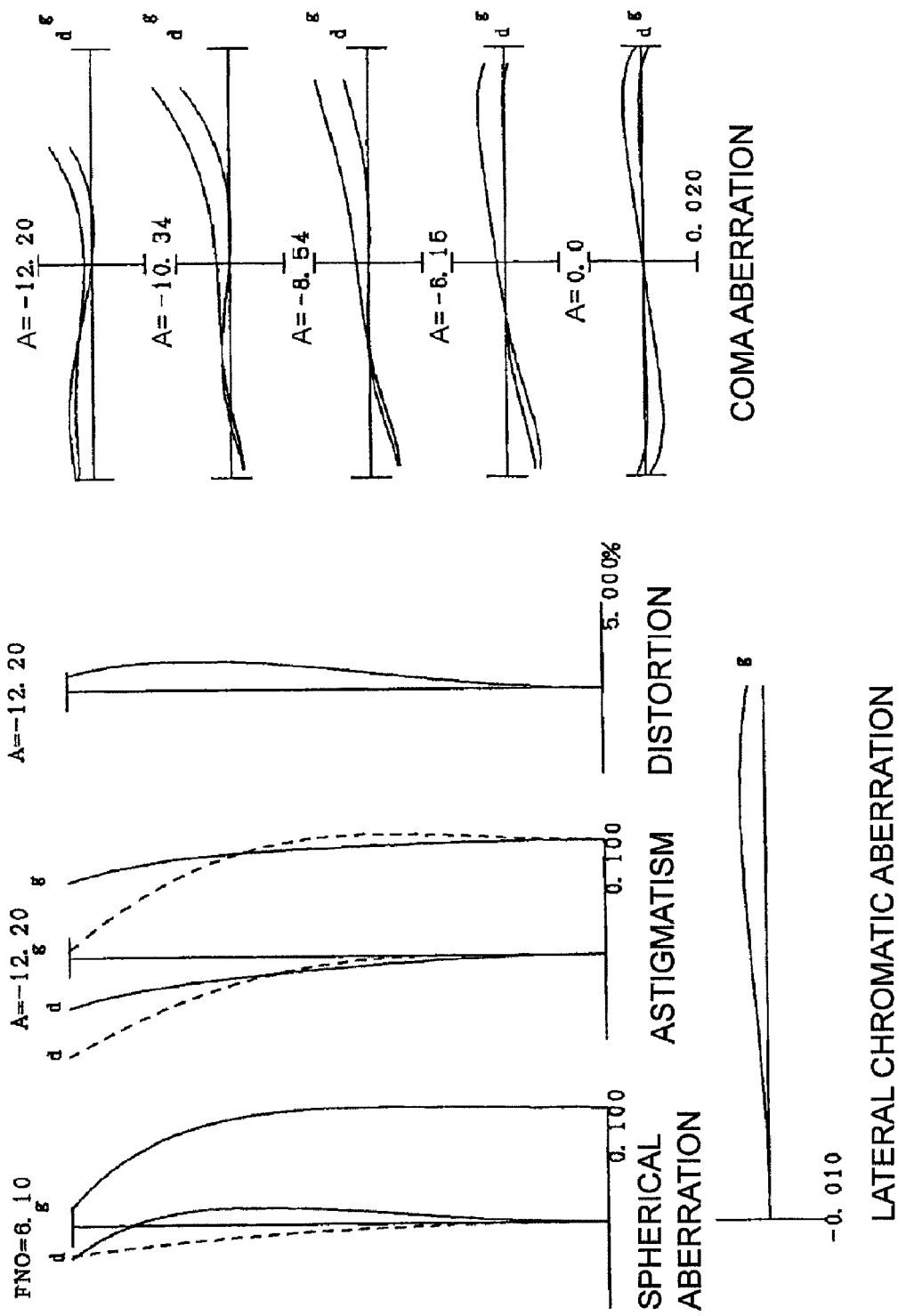

FIG. 8 shows graphs of various aberrations (spherical aberration, astigmatism, distortion, lateral chromatic aberration and coma aberration) of Example 4, where (a) FIG. 8A are graphs showing various aberrations upon focusing on infinity in the wide-angle end state, FIG. 8B are graphs showing various aberrations upon focusing on infinity in the intermediate focal length state, and FIG. 8C are graphs showing various aberrations upon focusing on infinity in the telephoto end state. As seen in the graphs showing each aberration, according to Example 4, various aberrations in each focal length state from the wide-angle end state to the telephoto end state can be appropriately corrected, and an excellent optical performance can be implemented.

Example 5

Example 5 will now be described with reference to FIG. 9, FIG. 10 and Table 5. FIG. 9 shows a configuration of the zoom lens according to Example 5, and the zoom locus thereof. As FIG. 9 shows, the zoom lens according to Example 5 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a biconvex plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2, the aperture stop S and the third lens group G3 move.

Table 5 shows a table of each parameter in Example 5. The surface numbers 1 to 16 in Table 5 correspond to the surfaces 1 to 16 in FIG. 9. In Example 5, the sixth, seventh, eleventh and twelfth lens surfaces all have aspherical shapes.

TABLE 5

[Lens data]

| surface number | r | d | nd | vd |
|---|---|---|---|---|
| 1 | 132.2275 | 0.8 | 1.7550 | 52.3 |
| 2 | 6.6364 | 1.6 | | |
| 3 | 7.1306 | 1.2 | 1.8467 | 23.8 |
| 4 | 9.7228 | (D4) | | |
| 5 | ∞ | 0.0 | (Aperture stop S) | |
| *6 | 5.8019 | 1.2 | 1.6935 | 53.2 |
| *7 | -32.3534 | 0.1 | | |
| 8 | 5.5006 | 1.3 | 1.7292 | 54.7 |
| 9 | 37.8261 | 0.7 | 1.7552 | 27.5 |
| 10 | 3.0545 | (D10) | | |
| *11 | 44.5185 | 2.2 | 1.5327 | 56.2 |
| *12 | -9.5712 | (D12) | | |
| 13 | ∞ | 0.3 | 1.5444 | 70.5 |
| 14 | ∞ | 0.4 | | |
| 15 | ∞ | 0.5 | 1.5163 | 64.1 |
| 16 | ∞ | 0.6 | | |

[All parameters]

| | wide-angle end | | intermediate focal length | | telephoto end |
|---|---|---|---|---|---|
| f | 6.57 | ~ | 11.04 | ~ | 18.57 |
| Fno | 3.3 | ~ | 4.4 | ~ | 6.2 |
| ω | 33.4 | ~ | 19.9 | ~ | 12.2 |
| y | 4.050 | ~ | 4.050 | ~ | 4.050 |
| Bf | 4.25 | ~ | 4.05 | ~ | 3.73 |
| TL | 26.54 | ~ | 25.04 | ~ | 28.18 |

[Spherical data]

sixth surface $\kappa$ = +2.41, A4 = -1.5319E-03, A6 = -8.2415E-05,
A8 = 0.0000E+00, A10 = 0.0000E+00
seventh surface $\kappa$ = +1.00, A4 = 0.0000E+00, A6 = 0.0000E+00,
A8 = 0.0000E+00, A10 = 0.0000E+00
eleventh surface $\kappa$ = +1.00, A4 = +8.4264E-04, A6 = -6.4977E-06,
A8 = 0.0000E+00, A10 = 0.0000E+00
twelfth surface $\kappa$ = +1.00, A4 = +1.5279E-03, A6 = -1.7951E-05,
A8 = 0.0000E+00, A10 = 0.0000E+00

TABLE 5-continued

[Variable distance data]

| variable distance | wide-angle end | intermediate focal length | telephoto end |
|---|---|---|---|
| D4 | 9.45 | 3.92 | 0.62 |
| D10 | 3.74 | 7.97 | 14.74 |
| D12 | 2.73 | 2.53 | 2.20 |

[Lens group data]

| group No. | first surface group | focal length group |
|---|---|---|
| G1 | 1 | −14.5 |
| G2 | 6 | 9.1 |
| G3 | 11 | 15.0 |

[Conditional expressions]

conditional expression (1): (DG1 + DG2 + DG3)/fw = 1.39
conditional expression (2): (R2 − R3)/(R2 + R3) = −0.036
conditional expression (3): (−f1)/ft = 0.78
conditional expression (4): f2/ft = 0.49
conditional expression (5): f3/fw = 2.28
conditional expression (6): d2/(−f1) = 0.11
conditional expression (7): S = 6.50

As the table of parameters in Table 5 shows, the zoom lens according to Example 5 satisfies all the above conditional expressions (1) to (7).

Figure 10A:
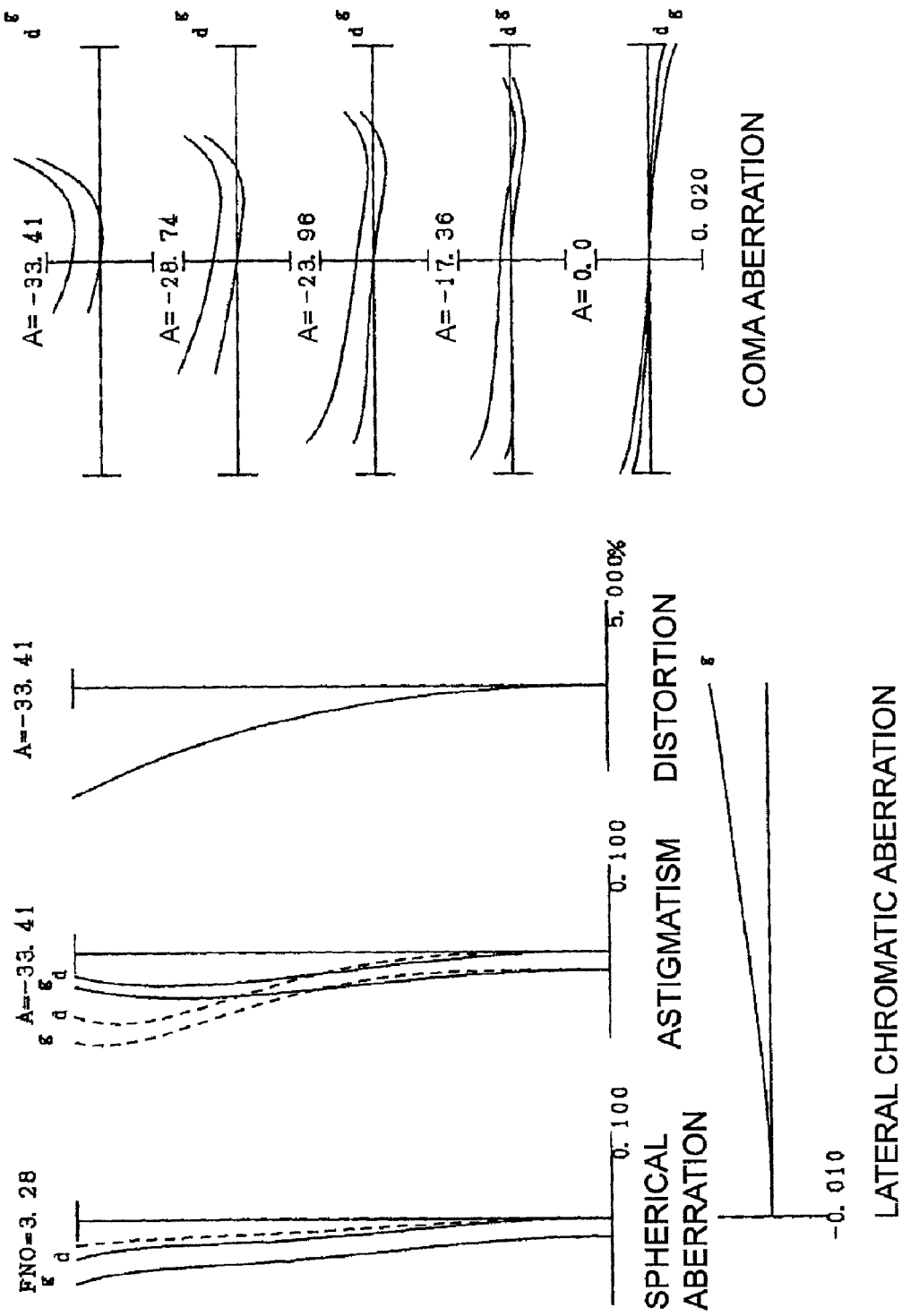
FIG. 10 are graphs showing various aberrations of the zoom lens according to Example 5, where FIG. 10A are graphs showing various aberrations upon focusing on infinity in the wide-angle end state, FIG. 10B are graphs showing various aberrations upon focusing on infinity in the intermediate focal length state, and FIG. 10C are graphs showing various aberrations upon focusing on infinity in the telephoto end state.
Figure 10B:
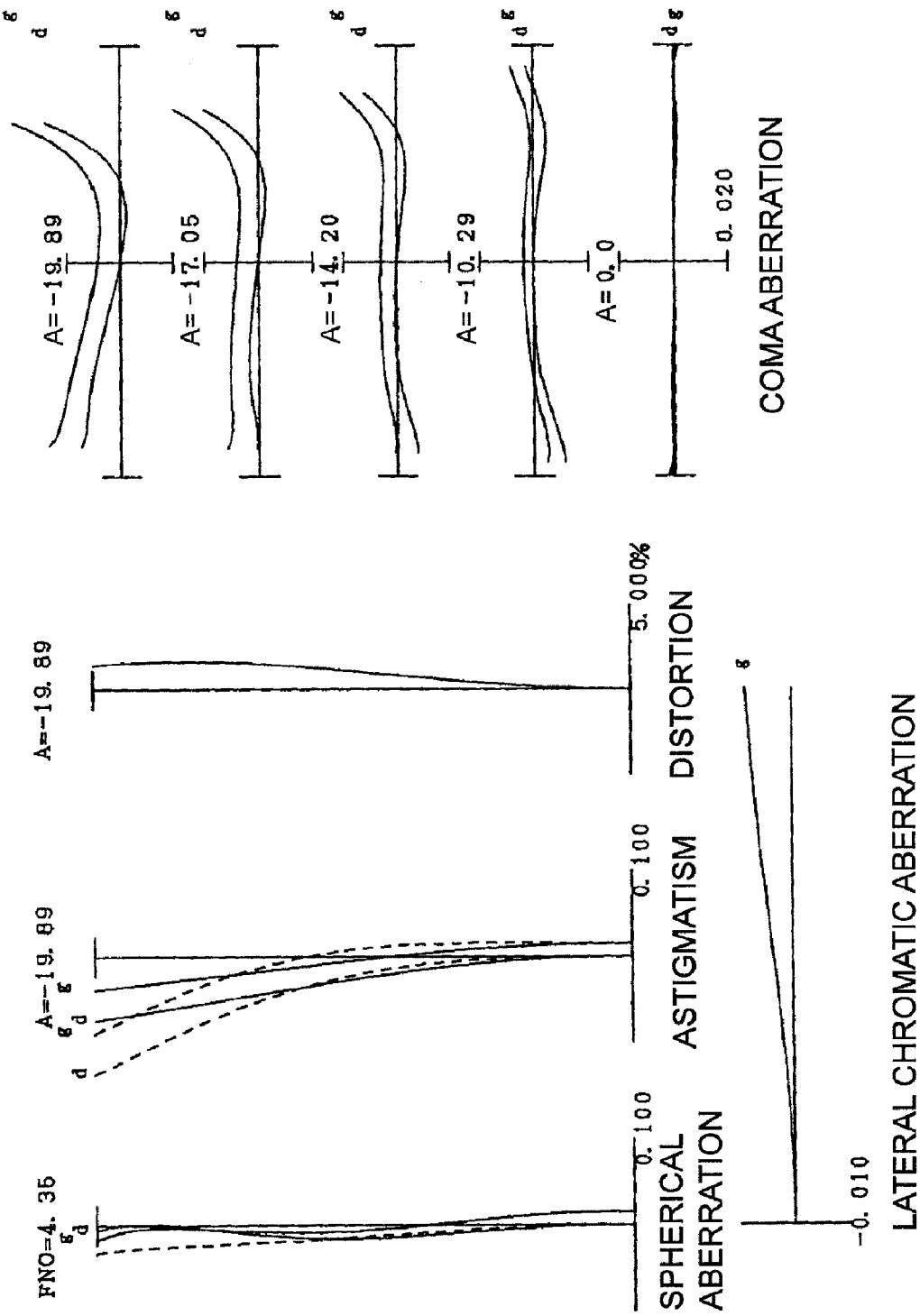
Figure 10C:
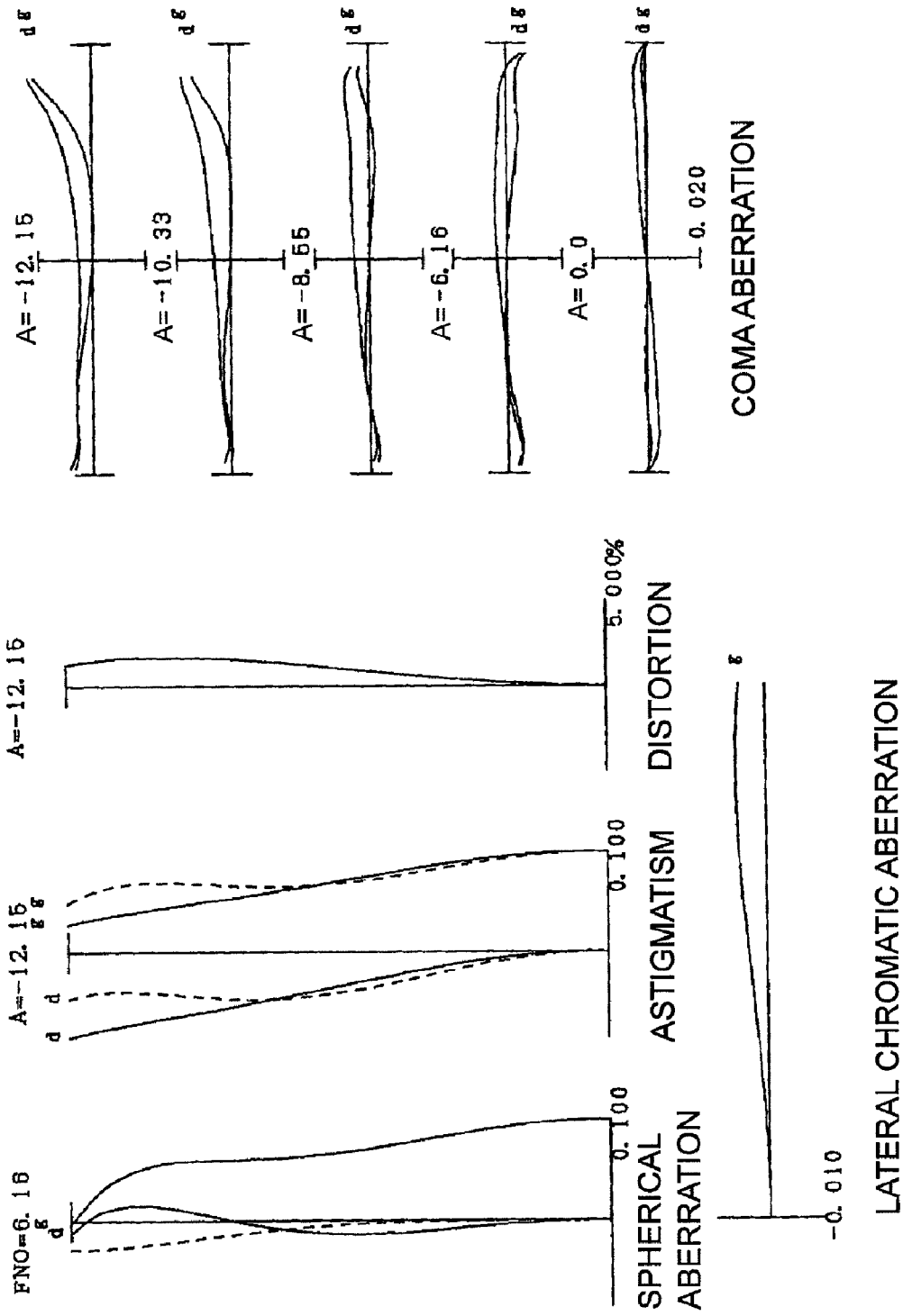

FIG. 10 shows graphs of various aberrations (spherical aberration, astigmatism, distortion, lateral chromatic aberration and coma aberration) of Example 5, where FIG. 10A are graphs showing various aberrations upon focusing on infinity in the wide-angle end state, FIG. 10B are graphs showing various aberrations upon focusing on infinity in the intermediate focal length state, and FIG. 10C are graphs showing various aberrations upon focusing on infinity in the telephoto end state. As seen in the graphs showing each aberration, according to Example 5, various aberrations in each focal length state from the wide-angle end state to the telephoto end state can be appropriately corrected, and an excellent optical performance can be implemented.

Example 6

Example 6 will now be described with reference to FIG. 11, FIG. 12 and Table 6. FIG. 11 shows a configuration of the zoom lens according to Example 6, and the zoom locus thereof. As FIG. 11 shows, the zoom lens according to Example 6 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a biconvex plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2, the aperture stop S and the third lens group G3 move.

Table 6 shows a table of each parameter in Example 6. The surface numbers 1 to 16 in Table 6 correspond to the surfaces 1 to 16 in FIG. 11. In Example 6, the sixth, seventh, eleventh and twelfth lens surfaces all have aspherical shapes.

TABLE 6

[Lens data]

| surface number | r | d | nd | vd |
|---|---|---|---|---|
| 1 | 93.5947 | 0.8 | 1.8830 | 40.8 |
| 2 | 7.3341 | 2.0 | | |
| 3 | 8.1581 | 1.3 | 1.9460 | 18.0 |
| 4 | 11.0345 | (D4) | | |
| 5 | ∞ | 0.0 | (Aperture stop S) | |
| *6 | 5.3567 | 1.6 | 1.5920 | 67.1 |
| *7 | −18.0652 | 0.1 | | |
| 8 | 5.7006 | 1.5 | 1.8830 | 40.8 |
| 9 | −10.1432 | 0.6 | 1.9037 | 31.3 |
| 10 | 3.1049 | (D10) | | |
| *11 | −247.6705 | 1.9 | 1.5327 | 56.2 |
| *12 | −9.746 | (D12) | | |
| 13 | ∞ | 0.3 | 1.5444 | 70.5 |
| 14 | ∞ | 0.4 | | |
| 15 | ∞ | 0.5 | 1.5163 | 64.1 |
| 16 | ∞ | 0.6 | | |

[All parameters]

| | wide-angle end | | intermediate focal length | | telephoto end |
|---|---|---|---|---|---|
| f | 6.52 | ~ | 12.66 | ~ | 24.57 |
| Fno | 3.0 | ~ | 4.4 | ~ | 7.0 |
| ω | 34.0 | ~ | 17.7 | ~ | 9.5 |
| y | 4.050 | ~ | 4.050 | ~ | 4.050 |
| Bf | 4.58 | ~ | 4.05 | ~ | 3.12 |
| TL | 29.25 | ~ | 27.58 | ~ | 33.25 |

[Spherical data]

sixth surface

κ = −0.08, A4 = −8.3013E−05, A6 = −4.2461E−06,
A8 = 0.0000E+00, A10 = 0.0000E+00 seventh surface

κ = +1.00, A4 = 0.0000E+00, A6 = 0.0000E+00,
A8 = 0.0000E+00, A10 = 0.0000E+00 eleventh surface

κ = +1.00, A4 = +8.8326E−04, A6 = −2.1587E−05,
A8 = 0.0000E+00, A10 = 0.0000E+00 twelfth surface

κ = +1.00, A4 = +1.3216E−03, A6 = −3.0891E−05,
A8 = 0.0000E+00, A10 = 0.0000E+00

[Variable distance data]

| variable distance | wide-angle end | intermediate focal length | telephoto end |
|---|---|---|---|
| D4 | 11.14 | 4.14 | 0.51 |
| D10 | 3.73 | 9.59 | 19.82 |
| D12 | 2.96 | 2.42 | 1.49 |

TABLE 6-continued

[Lens group data]

| group No. | first surface group | focal length group |
|---|---|---|
| G1 | 1 | −13.9 |
| G2 | 6 | 9.3 |
| G3 | 11 | 19.0 |

[Conditional expressions]

conditional expression (1): (DG1 + DG2 + DG3)/fw = 1.50
conditional expression (2): (R2 − R3)/(R2 + R3) = −0.053
conditional expression (3): (−f1)/ft = 0.57
conditional expression (4): f2/ft = 0.38
conditional expression (5): f3/fw = 2.91
conditional expression (6): d2/(−f1) = 0.14
conditional expression (7): S = 6.67

As the table of parameters in Table 6 shows, the zoom lens according to Example 6 satisfies all the above conditional expressions (1) to (7).

Figure 12A:
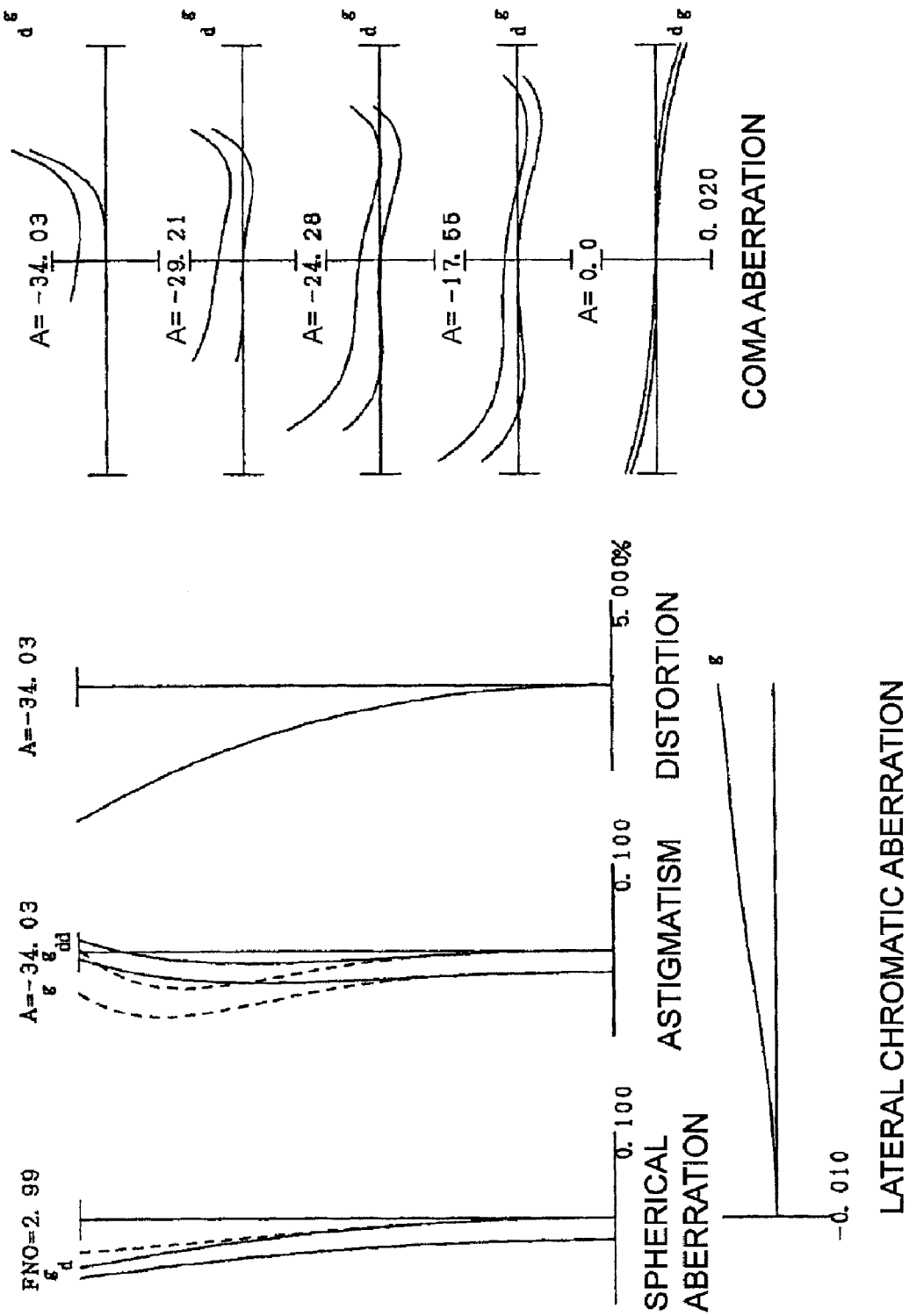
FIG. 12 are graphs showing various aberrations of the zoom lens according to Example 6, where FIG. 12A are graphs showing various aberrations upon focusing on infinity in the wide-angle end state, FIG. 12B are graphs showing various aberrations upon focusing on infinity in the intermediate focal length state, and FIG. 12C are graphs showing various aberrations upon focusing on infinity in the telephoto end state.
Figure 12B:
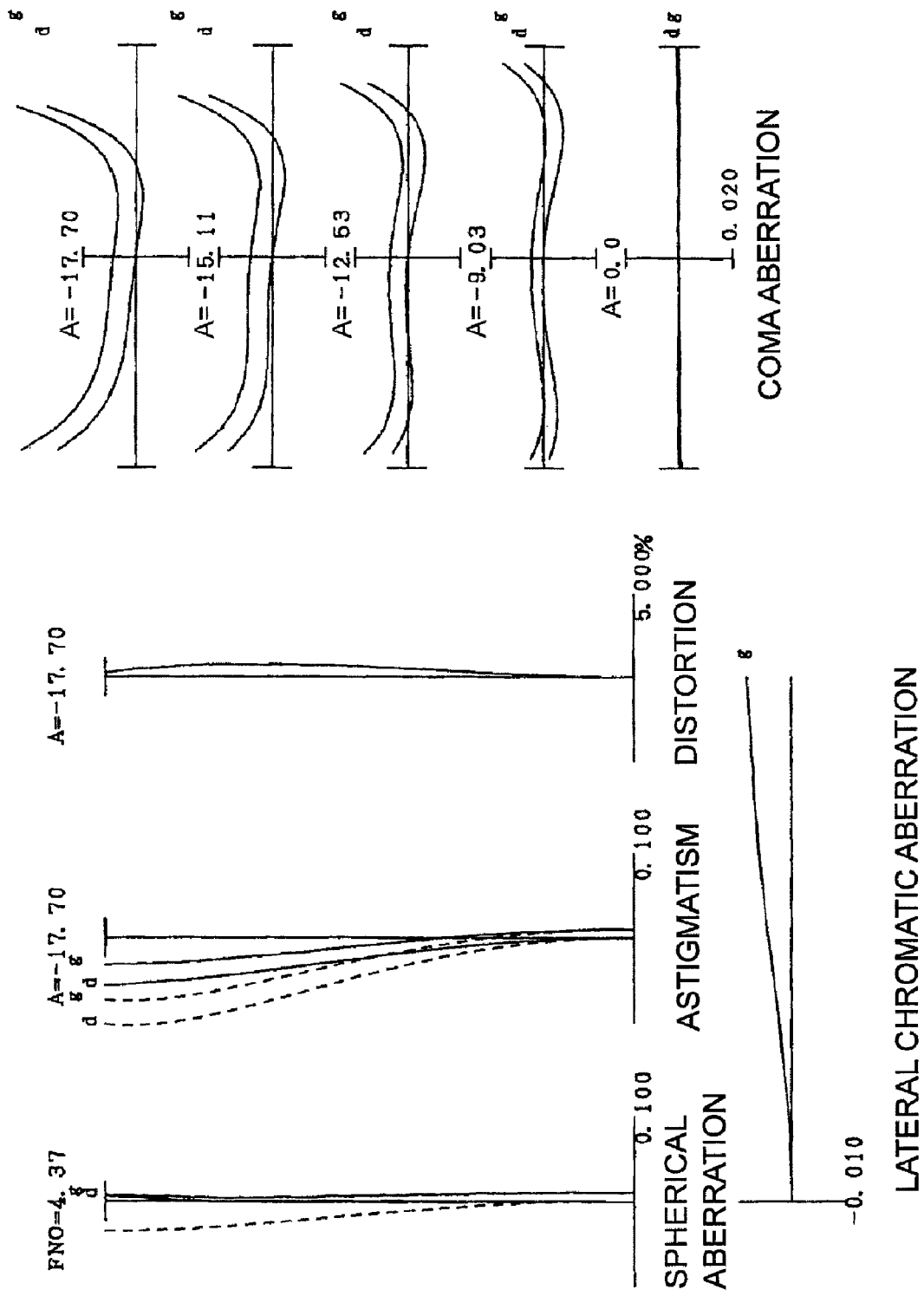
Figure 12C:
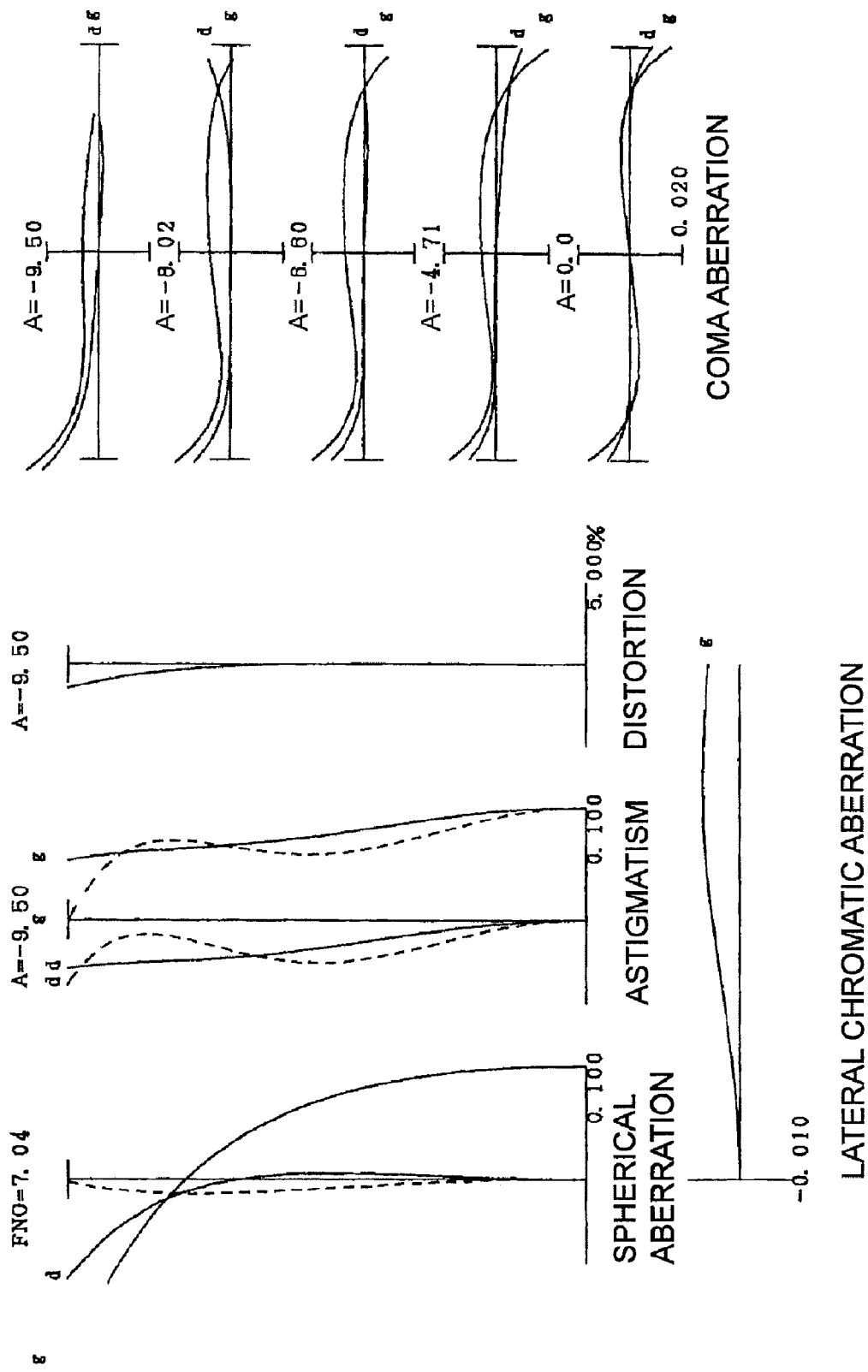

FIG. 12 shows graphs of various aberrations (spherical aberration, astigmatism, distortion, lateral chromatic aberration and coma aberration) of Example 6, where FIG. 12A are graphs showing various aberrations upon focusing on infinity in the wide-angle end state, FIG. 12B are graphs showing various aberrations upon focusing on infinity in the intermediate focal length state, and FIG. 12C are graphs showing various aberrations upon focusing on infinity in the telephoto end state. As seen in the graphs showing each aberration, according to Example 6, various aberrations in each focal length state from the wide-angle end state to the telephoto end state can be appropriately corrected, and an excellent optical performance can be implemented.

Example 7

Example 7 will now be described with reference to FIG. 13, FIG. 14 and Table 7. FIG. 13 shows a configuration of the zoom lens according to Example 7, and the zoom locus thereof. As FIG. 13 shows, the zoom lens according to Example 2 has, in order from an object, a first lens group G1 having negative refractive power, a second lens group G2 having positive refractive power, and a third lens group G3 having positive refractive power.

The first lens group G1 has, in order from the object, a negative meniscus spherical negative lens L11 having a convex surface facing the object, and a positive meniscus spherical positive lens L12 having a convex surface facing the object.

The second lens group G2 has, in order from the object, a biconvex positive lens L21 and a cemented lens of a biconvex positive lens L22 and a biconcave negative lens L23.

The third lens group G3 has a plastic positive lens L31.

An aperture stop S for adjusting quantity of light is disposed between the first lens group G1 and the second lens group G2.

A low pass filter LPF for cutting a spatial frequency exceeding critical resolution of the solid image sensing element, such as a CCD disposed on the imaging plane I, is disposed between the third lens group G3 and the imaging plane I.

In the zoom lens of this Example having the above configuration, the first lens group G1, the second lens group G2, the aperture stop S and the third lens group G3 move.

Table 7 shows a table of each parameter in Example 7. The surface numbers 1 to 16 in Table 7 correspond to the surfaces 1 to 16 in FIG. 13. In Example 7, the sixth, seventh, eleventh and twelfth lens surfaces all have aspherical shapes.

TABLE 7

[Lens data]

| surface number | r | d | nd | vd |
|---|---|---|---|---|
| 1 | −55.4526 | 0.8 | 1.8348 | 42.7 |
| 2 | 8.8195 | 1.6 | | |
| 3 | 8.6331 | 1.1 | 1.9460 | 18.0 |
| 4 | 11.5035 | (D4) | | |
| 5 | ∞ | 0.0 | (Aperture stop S) | |
| *6 | 4.3365 | 1.3 | 1.5920 | 67.1 |
| *7 | −15.2704 | 0.1 | | |
| 8 | 5.9716 | 1.4 | 1.7550 | 52.3 |
| 9 | −19.3366 | 0.5 | 1.8010 | 35.0 |
| 10 | 2.8474 | (D10) | | |
| *11 | −306.9483 | 1.7 | 1.5327 | 56.2 |
| *12 | −8.636 | (D12) | | |
| 13 | ∞ | 0.3 | 1.5444 | 70.5 |
| 14 | ∞ | 0.4 | | |
| 15 | ∞ | 0.5 | 1.5163 | 64.1 |
| 16 | ∞ | 0.6 | | |

[All parameters]

| | wide-angle end | | intermediate focal length | | telephoto end |
|---|---|---|---|---|---|
| f | 7.01 | ~ | 11.81 | ~ | 19.76 |
| Fno | 3.2 | ~ | 4.3 | ~ | 6.1 |
| ω | 31.5 | ~ | 18.9 | ~ | 11.7 |
| y | 4.050 | ~ | 4.050 | ~ | 4.050 |
| Bf | 3.80 | ~ | 3.32 | ~ | 2.80 |
| TL | 25.09 | ~ | 24.43 | ~ | 27.68 |

[Spherical data]

sixth surface

κ = −0.14, A4 = 3.6165E−04, A6 = −1.3854E−06,
A8 = 0.0000E+00, A10 = 0.0000E+00 seventh surface

κ = +4.56, A4 = 6.5760E−04, A6 = 1.0630E−05,
A8 = −2.6831E−06, A10 = 0.0000E+00 eleventh surface

κ = +1.00, A4 = −9.5386E−04, A6 = +1.7544E−04,
A8 = −4.6617E−06, A10 = 0.0000E+00 twelfth surface

κ = +3.16, A4 = +2.3480E−04, A6 = +1.4068E−04,
A8 = −2.3633E−06, A10 = 0.0000E+00

[Variable distance data]

| variable distance | wide-angle end | intermediate focal length | telephoto end |
|---|---|---|---|
| D4 | 8.29 | 3.68 | 0.87 |
| D10 | 4.60 | 9.03 | 15.61 |
| D12 | 2.17 | 1.69 | 1.20 |

[Lens group data]

| group No. | first surface group | focal length group |
|---|---|---|
| G1 | 1 | −13.0 |
| G2 | 6 | 8.4 |
| G3 | 11 | 16.6 |

TABLE 7-continued

[Conditional expressions]

conditional expression (1): (DG1 + DG2 + DG3)/fw = 1.20
conditional expression (2): (R2 − R3)/(R2 + R3) = 0.01
conditional expression (3): (−f1)/ft = 0.66
conditional expression (4): f2/ft = 0.42
conditional expression (5): f3/fw = 2.38
conditional expression (6): d2/(−f1) = 0.12
conditional expression (7): S = 7.02

As the table of parameters in Table 7 shows, the zoom lens according to Example 7 satisfies all the above conditional expressions (1) to (7).

Figure 14A:
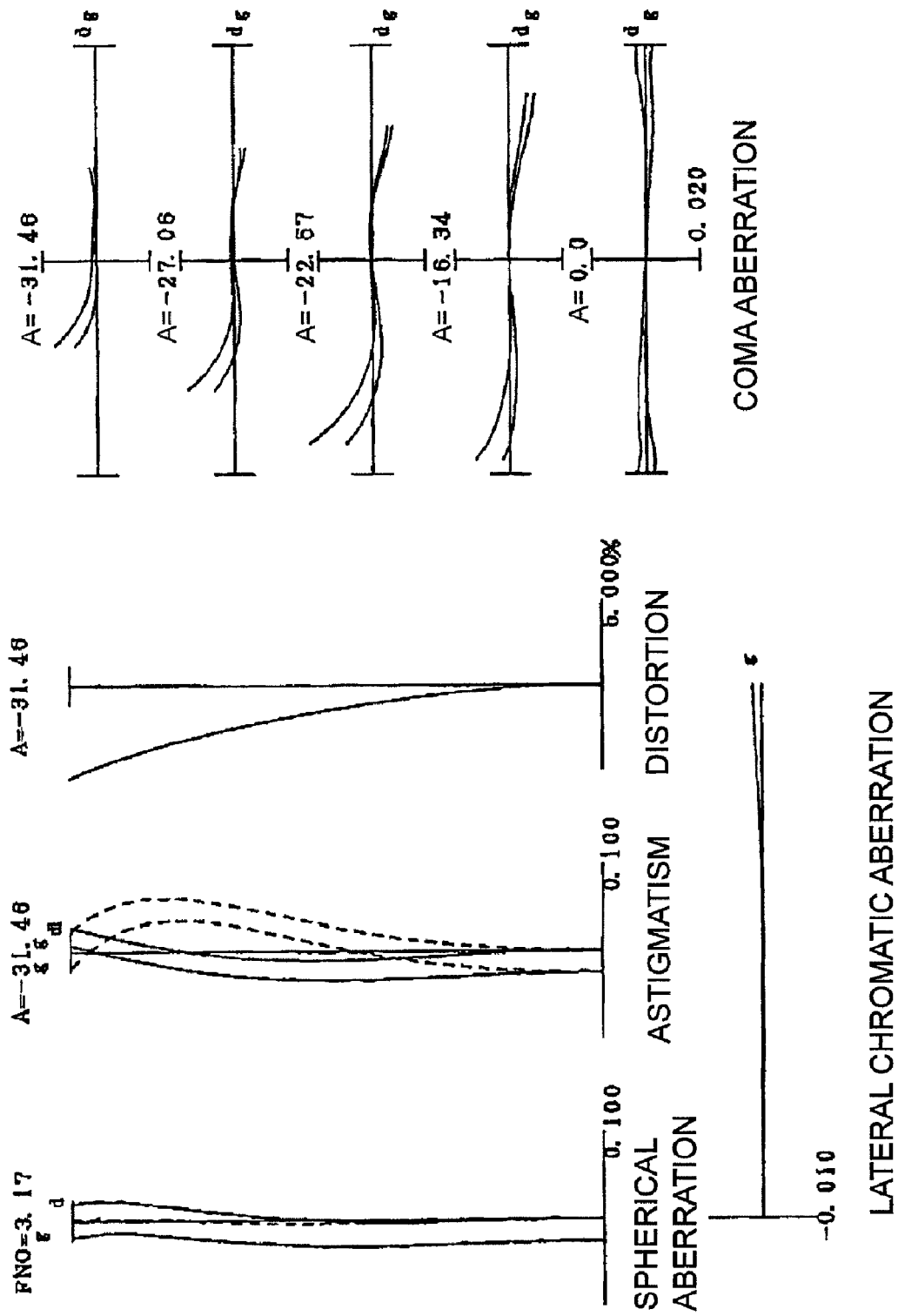
FIG. 14 are graphs showing various aberrations of the zoom lens according to Example 7, where FIG. 14A are graphs showing various aberrations upon focusing on infinity in the wide-angle end state, FIG. 14B are graphs showing various aberrations upon focusing on infinity in the intermediate focal length state, and FIG. 14C are graphs showing various aberrations upon focusing on infinity in the telephoto end state.
Figure 14B:
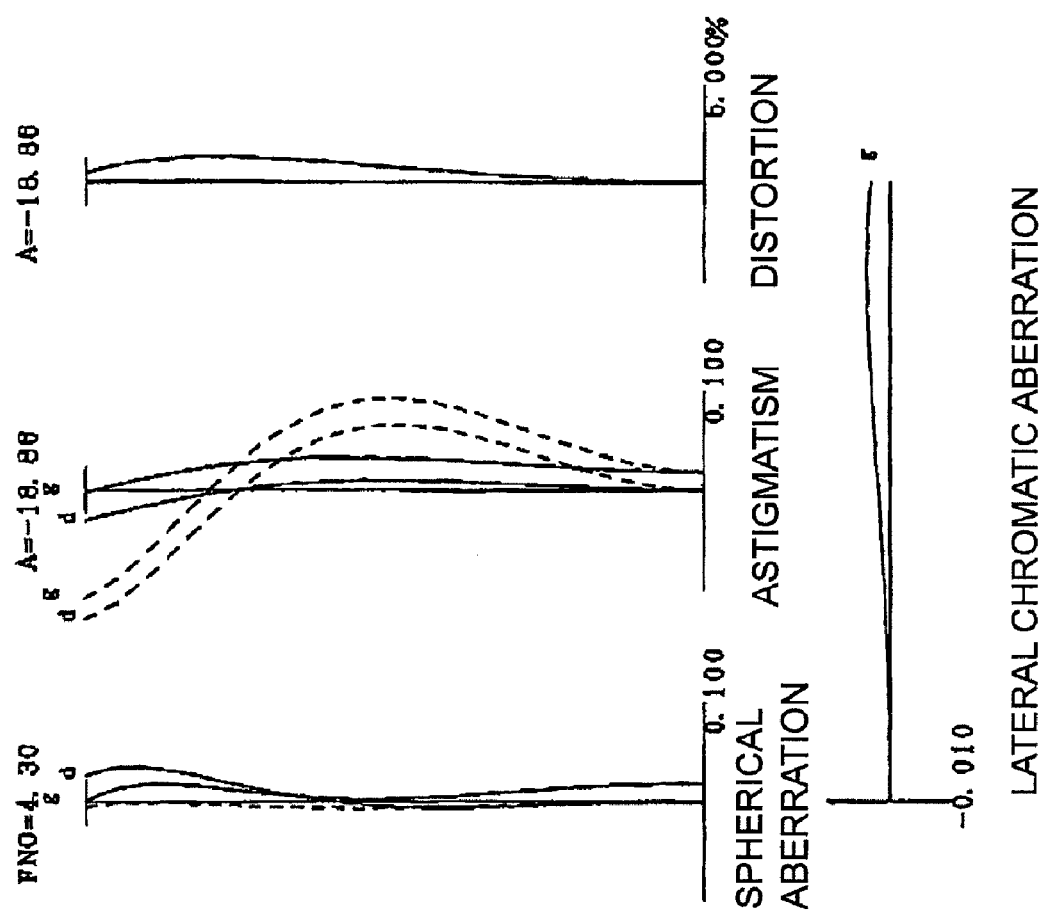
Figure 14C:
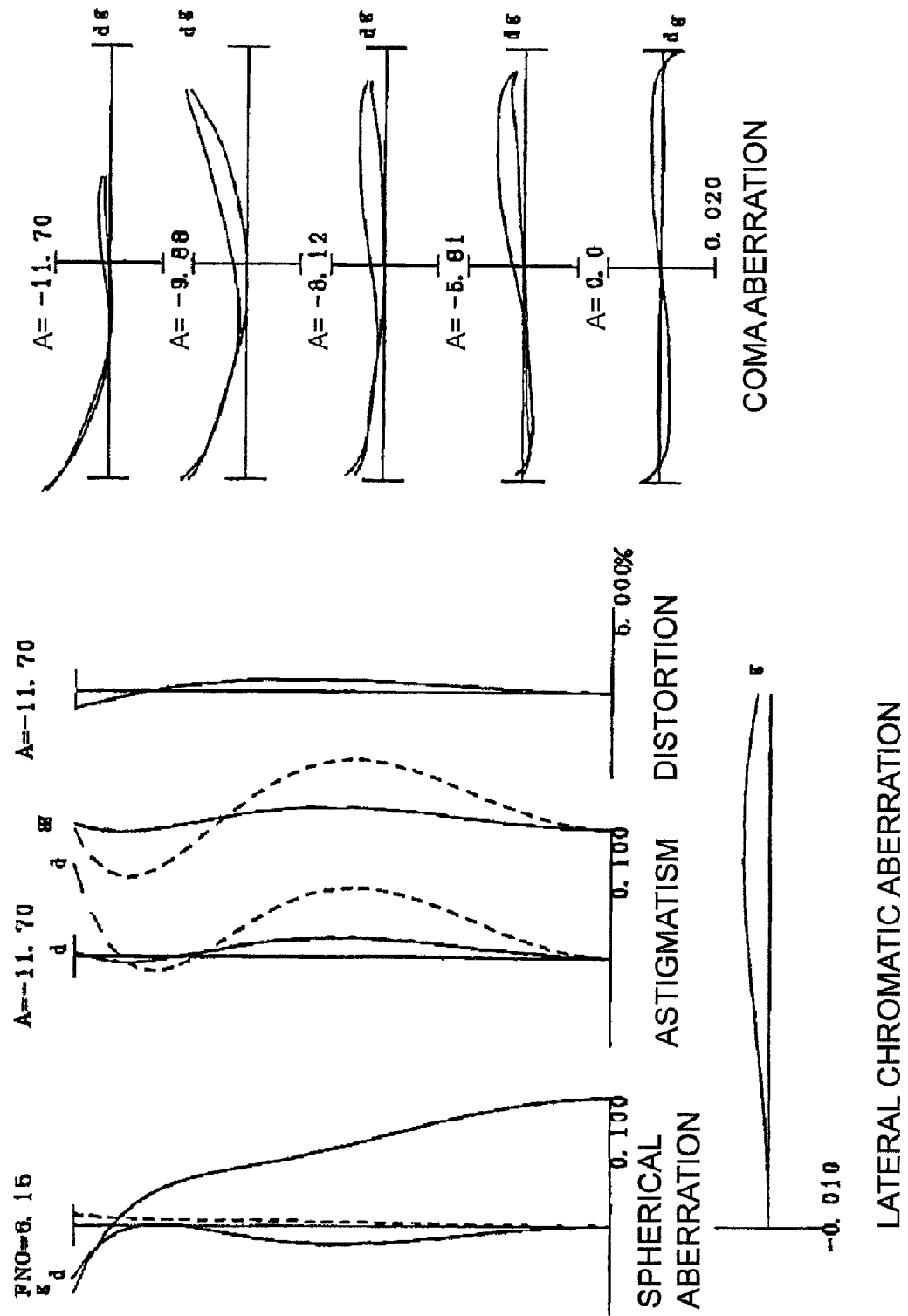

FIG. 14 shows graphs of various aberrations (spherical aberration, astigmatism, distortion, lateral chromatic aberration and coma aberration) of Example 7, where FIG. 14A are graphs showing various aberrations upon focusing on infinity in the wide-angle end state, FIG. 14B are graphs showing various aberrations upon focusing on infinity in the intermediate focal length state, and FIG. 14C are graphs showing various aberrations upon focusing on infinity in the telephoto end state. As seen in the graphs showing each aberration, according to Example 7, various aberrations in each focal length state from the wide-angle end state to the telephoto end state can be appropriately corrected, and an excellent optical performance can be implemented.

In the above embodiment, the following content may be used when appropriate, within a range that does not diminish the optical performance.

In the above examples, a zoom lens having a three-group configuration was shown, but the present invention can also be applied to other group configurations, such as a four-group or five-group configuration. The present invention can also be applied to a configuration in which a lens or a lens group is added at the side closest to the object, or a configuration in which a lens or lens group is added at the side closest to the image. A lens group refers to a portion having at least one lens, separated by an air space which changes upon zooming.

A focusing lens group, which focuses from an infinite distance object to a short distance object, by moving a single or plurality of lens group(s) or a partial lens group in the optical axis direction, may be used. This focusing lens group can also be applied to auto focus, and is also appropriate for driving a motor for auto focus (using an ultrasonic motor). It is particularly preferable that the third lens group G3 is the focusing lens group.

A lens group or a partial lens group may be a vibration proof lens group for correcting an image blur generated by hand motion, by vibrating the lens group or a partial lens group in a direction perpendicular to the optical axis, or by rotating (oscillating) in the in-plane direction including the optical axis. It is particularly preferable that all or a part of the second lens group G2 is a vibration proof lens.

The lens surfaces of the second lens group G2 and the third lens group G3 may be a spherical surface, plane surface or aspherical surface. If the lens surface is spherical or a plane, lens processing and assembly adjustment are easy, and deterioration of optical performance due to error in processing and assembly adjustment can be prevented, which is preferable. Even if the imaging plane is shifted, deterioration of writing performance is minor, which is preferable. If the lens is aspherical, the aspherical surface may be an aspherical surface created by grinding, a glass mold aspherical surface created by molding glass into an aspherical shape using a die, or a composite aspherical surface created by forming resin on the surface of glass into an aspherical shape. The lens surface may be a diffraction plane, and the lens may be a diffractive index distribution type lens (GRIN lens) or a plastic lens.

It is preferable to dispose the aperture stop S near the second lens group G2, but this role may be substituted by a lens frame, without disposing a separate element as the aperture stop.

An anti-reflection film having high transmittance in a wide wavelength are may be formed on each lens surface so as to decrease flares and ghosts, implementing high optical performance with high contrast.

In the zoom lens (zooming optical system) of the present embodiment, the zooming ratio is about 2.5 to 4.5.

In the zoom lens (zooming optical system) of the present embodiment, it is preferable that the first lens group G1 has one positive lens and one negative lens. It is preferable to dispose, in order from the object, the negative lens and the positive lens with an air space there between. It is preferable that the second lens group G2 has two positive lenses and one negative lens. It is preferable to dispose lenses, in order from a positive lens, positive lens and negative lens with an air space there between. It is preferable that the third lens group G3 has one positive lens.

The present invention was described using the composing requirements of the embodiments, but needless to say, the present invention is not limited to these.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object: a first lens group having negative refractive power; a second lens group having positive refractive power;
    and a third lens group having positive refractive power, the first lens group consisting of a spherical negative lens and a spherical positive lens with an air space therebetween, and
    the following conditional expression being satisfied:

$0.50 < (DG1+DG2+DG3)/fw < 1.75$ where DG1 denotes a thickness of the first lens group on the optical axis, DG2 denotes a thickness of the second lens group on the optical axis, DG3 denotes a thickness of the third lens group on the optical axis, and fw denotes a focal length of the zoom lens in a wide-angle end state.

2. The zoom lens according to claim 1, wherein the first lens group satisfies the following conditional expression:

$-0.125 < (R2-R3)/(R2+R3) < 0.125$ where R2 denotes a radius of curvature on the image side of the lens disposed to the object side, and R3 denotes a radius of curvature on the object side of the lens disposed to the image side.

3. The zoom lens according to claim 1, wherein the following conditional expression is satisfied:

$0.55 < (-f1)/ft < 0.85$ where f1 denotes a focal length of the first lens group and ft denotes a focal length of the zoom lens in a telephoto end state.

4. The zoom lens according to claim 1, wherein the following conditional expression is satisfied:

$0.20 < f2/ft < 0.52$ where f2 denotes a focal length of the second lens group and ft denotes a focal length of the zoom lens in a telephoto end state.

5. The zoom lens according to claim 1, wherein the following conditional expression is satisfied:

$$2.05 < f3/fw < 3.50$$

where f3 denotes a focal length of the third lens group and fw denotes a focal length of the zoom lens in a wide-angle end state.

6. The zoom lens according to claim 1, wherein the following conditional expression is satisfied:

$$0.08 < d2/(-f1) < 0.16$$

where f1 denotes a focal length of the first lens group, and d2 denotes the air space between the spherical negative lens and the spherical positive lens constituting the first lens group.

7. The zoom lens according to claim 1, wherein the following conditional expression is satisfied:

$$3.5 < S < 12.0$$

where S denotes a shape factor of the positive lens constituting the first lens group, (shape factors are defined as $S=(r2+r1)/(r2-r1)$, where r1 denotes a radius of curvature of the lens surface to the object side of the positive lens on the optical axis, and r2 denotes a radius of curvature of the lens surface to the image side of the positive lens on the optical axis).

8. The zoom lens according to claim 1, wherein the lens constituting the third lens group is an aspherical lens.

9. The zoom lens according to claim 1, wherein the lens constituting the third lens group is a plastic lens.

10. The zoom lens according to claim 1, wherein the lens constituting the third lens group comprises a single lens component.

11. The zoom lens according to claim 1, wherein the lens constituting the third lens group comprises a single lens element.

12. The zoom lens according to claim 1, wherein an aperture stop is disposed between the first lens group and the second lens group.

13. The zoom lens according to claim 1, wherein an aperture stop moves together with the second lens group upon zooming from a wide-angle end state to a telephoto end state.

14. The zoom lens according to claim 1, wherein the second lens group comprises, in order from an object, a positive lens, and a cemented lens of a positive lens and negative lens.

15. The zoom lens according to claim 1, wherein the second lens group consists of, in order from an object, a positive lens, and a cemented lens of a positive lens and negative lens.

16. The zoom lens according to claim 1, wherein a distance between the first lens group and the second lens group, and a distance between the second lens group and the third lens group change respectively, upon zooming from a wide-angle end state to a telephoto end state.

17. The zoom lens according to claim 1, wherein the third lens group is fixed in an optical axis direction, upon zooming from a wide-angle end state to a telephoto end state.

18. An optical apparatus, equipped with the zoom lens according to claim 1.

19. A manufacturing method for a zoom lens having, in order from an object, a first lens group, a second lens group, and a third lens group, the method comprising the steps of:
   disposing only one spherical negative lens and one spherical positive lens with an air space therebetween, as the first lens group; and
   disposing each lens so that the first lens group has negative refractive power, the second lens group has positive refractive power, and the third lens group has positive refractive power, while satisfying the following conditional expression:

$$0.50 < (DG1+DG2+DG3)/fw < 1.75$$

where DG1 denotes a thickness of the first lens group on the optical axis, DG2 denotes a thickness of the second lens group on the optical axis, and DG3 denotes a thickness of the third lens group on the optical axis, and fw denotes a focal length of the zoom lens in a wide-angle end state.

20. The manufacturing method for the zoom lens according to claim 19, wherein the first lens group satisfies the following conditional expression:

$$-0.125 < (R2-R3)/(R2+R3) < 0.125$$

where R2 denotes a radius of curvature on the image side of the lens disposed to the object side, and R3 denotes a radius of curvature on the object side of the lens disposed to the image side.

21. The manufacturing method for the zoom lens according to claim 19, wherein the following conditional expression is satisfied:

$$0.55 < (-f1)/ft < 0.85$$

where f1 denotes a focal length of the first lens group and ft denotes a focal length of the zoom lens in a telephoto end state.

22. The manufacturing method for the zoom lens according to claim 19, wherein the following conditional expression is satisfied:

$$0.20 < f2/ft < 0.52$$

where f2 denotes a focal length of the second lens group and ft denotes a focal length of the zoom lens in a telephoto end state.

* * * * *